(12) United States Patent
Wang

(10) Patent No.: US 6,360,006 B1
(45) Date of Patent: Mar. 19, 2002

(54) COLOR BLOCK SELECTION

(75) Inventor: Shin-Ywan Wang, Tustin, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,716

(22) Filed: Sep. 29, 1998

(51) Int. Cl.[7] .................................................. G06K 9/00
(52) U.S. Cl. ........................................ 382/162; 382/164
(58) Field of Search ................................ 382/162–172, 382/173–180; 358/515–525

(56) References Cited

U.S. PATENT DOCUMENTS

| | | | |
|---|---|---|---|
| 5,048,109 A | 9/1991 | Bloomberg et al. | 382/50 |
| 5,075,872 A | 12/1991 | Kumagai | 395/132 |
| 5,231,482 A * | 7/1993 | Murakami et al. | 358/75 |
| 5,351,313 A | 9/1994 | Bessho et al. | 382/51 |
| 5,392,362 A * | 2/1995 | Kimura et al. | 382/9 |
| 5,502,495 A | 3/1996 | Bannai et al. | 358/447 |
| 5,509,085 A * | 4/1996 | Kakutani | 382/167 |
| 5,539,843 A * | 7/1996 | Murakami et al. | 382/270 |
| 5,588,072 A | 12/1996 | Wang | 382/176 |
| 5,649,025 A | 7/1997 | Revankar | 382/171 |
| 5,680,479 A | 10/1997 | Wang et al. | 382/176 |
| 5,696,842 A | 12/1997 | Shirasawa et al. | 382/176 |
| 5,710,828 A | 1/1998 | Hashimoto | 382/172 |
| 5,719,967 A | 2/1998 | Sekine | 382/266 |
| 5,729,624 A * | 3/1998 | Tanioka et al. | 382/162 |
| 5,848,185 A | 12/1998 | Koga et al. | 382/173 |

* cited by examiner

*Primary Examiner*—Phuoc Tran
*Assistant Examiner*—Amir Alavi
(74) *Attorney, Agent, or Firm*—Fitzpatrick, Cella, Harper & Scinto

(57) ABSTRACT

A system to identify features of a color document in which primary color values representing a color document are input, a threshold binarizing range is calculated based on the input values, the input values are binarized into binary values based on the threshold binarizing range, a colored region is identified within the document, and a frame is defined surrounding the identified colored region. A second threshold binarizing range is calculated based on input primary values corresponding to the colored region, and the input primary values corresponding to the colored region are binarized into binarized values based on the second threshold binarizing range.

18 Claims, 26 Drawing Sheets

$$avg = \frac{(a+b+c+d)}{4}$$

FIG. 7

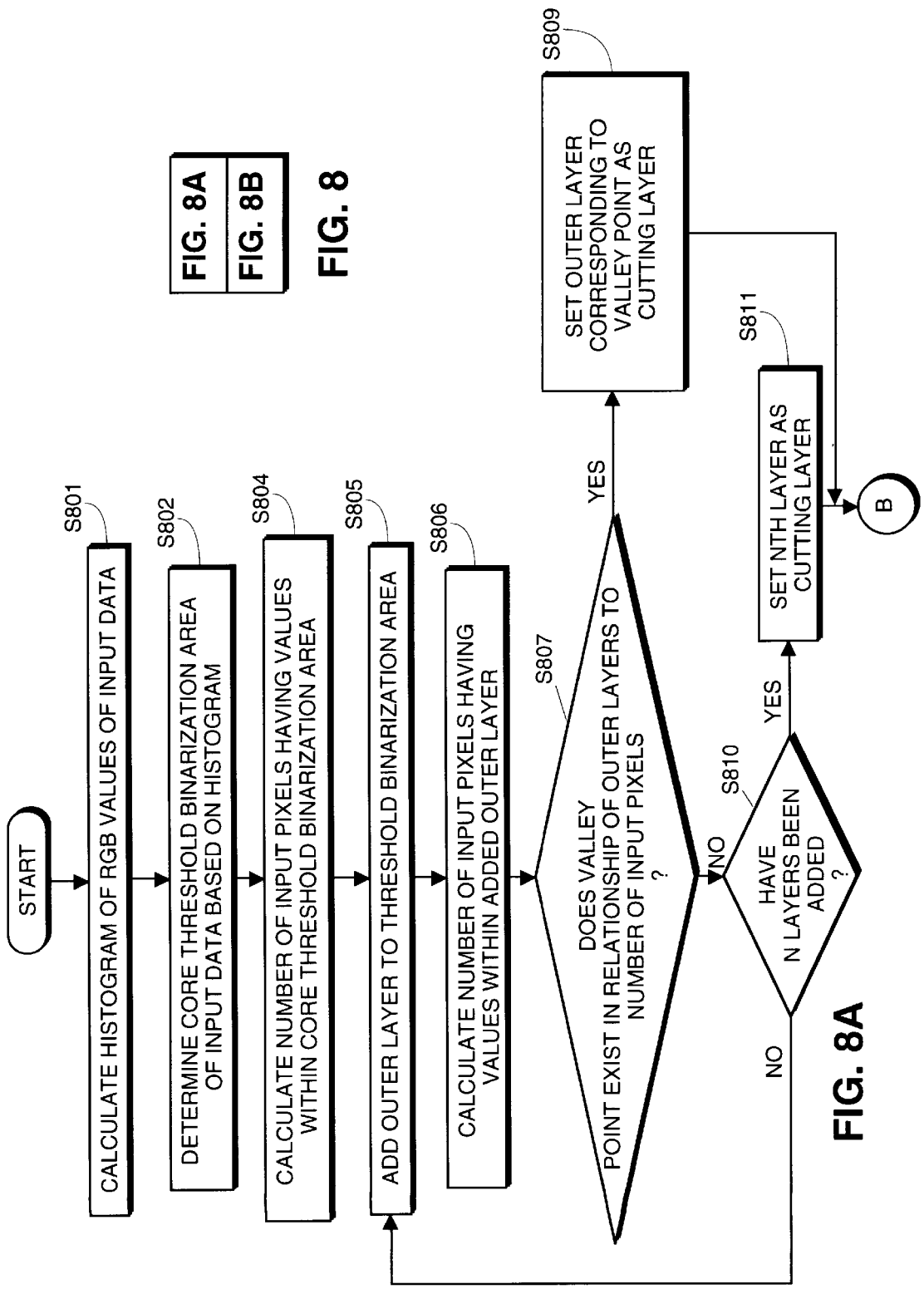

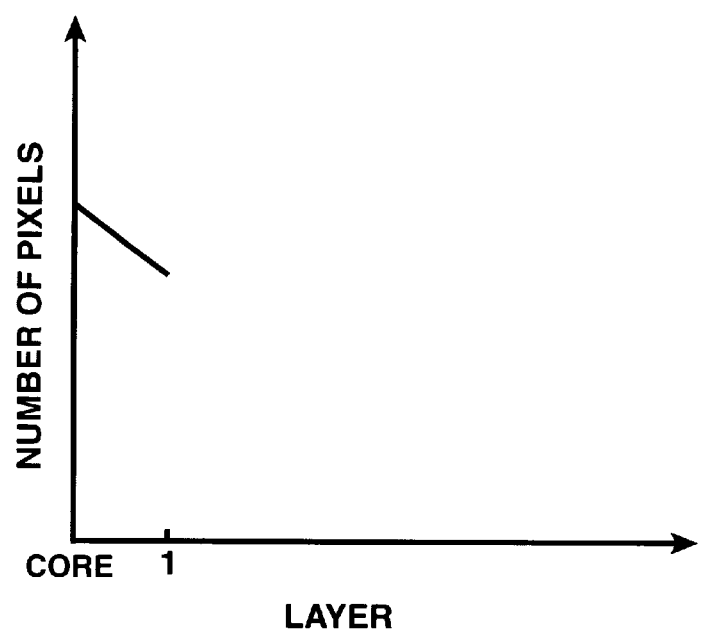
FIG. 11A
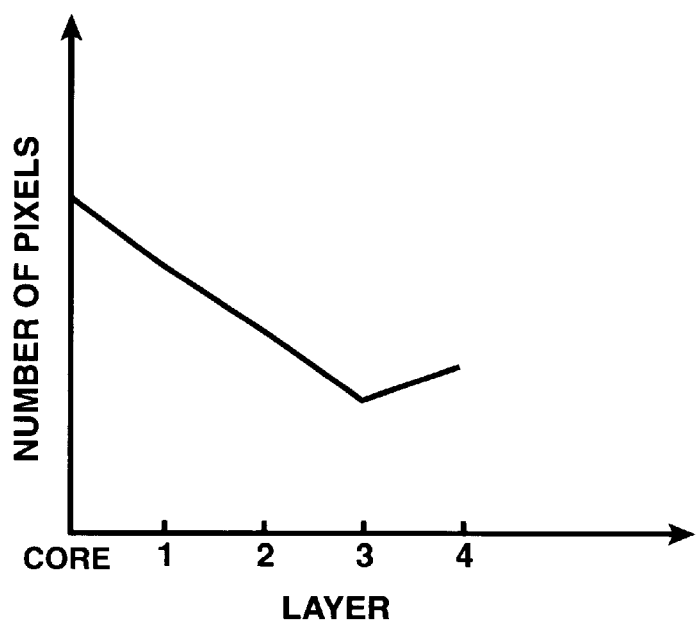
FIG. 11B
FIG. 11

THIS IS BROWN TEXT
IN A BLUE REGION

FIG. 21

COLOR BLOCK SELECTION

BACKGROUND OF THE INVENTION

1. Field of the Invention

The present invention concerns a system for analyzing color documents. In particular, the present invention relates to a system in which various features of a color document are identified and in which the identified features are analyzed to create a hierarchical representation of the color document.

2. Incorporation by Reference

Commonly-assigned U.S. applications Ser. No. 07/873,012, now U.S. Pat. No. 5,680,479, entitled "Method and Apparatus For Character Recognition", Ser. No. 08/171,720, now U.S. Pat. No. 5,588,072, entitled "Method and Apparatus For Selecting Text And/Or Non-Text Blocks In A Stored Document", Ser. No. 08/338,781, entitled "Page Analysis System", Ser. No. 08/514,252, entitled "Feature Extraction System", Ser. No. 08/664,674, entitled "System For Extracting Attached Text", Ser. No. 08/751,677, entitled "Page Analysis System", Ser. No. 08/834,856, entitled "Block Selection Review and Editing System", and Ser. No. 09/002,684, entitled "System For Analyzing Table Images", are herein incorporated as if set forth in full.

3. Description of the Related Art

Conventional page segmentation systems receive image data representing a document, identify regions of the document based on the data, and process the data in accordance with the identified regions. For example, identified text regions may be subjected to-optical character recognition (OCR) processing and identified image regions may be subjected to image compression. Additionally, conventional systems store data representing the physical layout of the document regions, ASCII data corresponding to text regions, and/or compressed data corresponding to image data from the document. Such systems thereby allow substantial reproduction or editing of the document using the stored data. However, these systems operate only on binary (black/white) image data.

In order to process color documents, conventional scanners are often used to convert the color documents into binary image data for subsequent input to a conventional page segmentation system. This conversion discards color information representative of colors within the color documents. Consequently, a conventional page segmentation system which receives thus-converted binary data of a color document is unable to accurately detect features of the color document which are borne out through the use of different colors.

For example, related text areas within a color document are often indicated using a common background color for each of the related areas. Similarly, an area of stand-alone text within a document can be designated by using a background color for the stand-alone area which is different than a background color used for the remaining areas of the document. Accordingly, such relationships between areas within a color document may be incorrectly identified using conventional segmentation systems.

Moreover, because conventional systems discard color information, they provide no means for storing data concerning colored regions of a document. As a result, even if related areas of a color document are successfully identified by a conventional page segmentation system, it is not possible to accurately reconstruct or edit the color document based on output from the conventional system.

Recent systems, such as Xerox Pagis™ and Adobe Acrobat™, are capable of inputting a color document and outputting a representation of the document containing color information. However, the output representation is often inaccurate and is difficult to edit.

In view of the foregoing, what is needed is a system for identifying and representing features of a color document in which colored regions of the document, as well as features borne out by the colored regions, can be accurately identified and also editably represented within a data structure.

SUMMARY OF THE INVENTION

The present invention addresses the foregoing problems by providing a system to binarize a color document so as to maintain a representation of colored regions within the document, to submit binarized image data of the document to block selection processing in order to identify features of the document, and to store a hierarchical tree structure identifying features of the document, wherein the hierarchical tree structure includes color information of the document. By virtue of the foregoing, features of an input color document can be identified and also represented within a small data structure from which a substantial representation of the document can be constructed or edited.

Therefore, in one aspect, the present invention is a system to identify features of a color document in which primary color values representing a color document are input, a threshold binarizing range is calculated based on the input values, the input values are binarized into binary values based on the threshold binarizing range, a colored region is identified within the document, and a frame is defined surrounding the identified colored region. In addition, a second threshold binarizing range is calculated based on input primary values corresponding to the colored region, and the input primary values corresponding to the colored region are binarized into binarized values based on the second threshold binarizing range. Preferably, a background color of the image is calculated based on input primary values corresponding to the threshold binarizing area and a background color of the colored region is calculated based on the input primary values corresponding to the colored region.

As a result of the foregoing system, a binary representation of a color document is produced in which a colored region within the color document is represented by a binary frame, and in which background colors of the document and of the colored region are calculated. In addition, the binary image data produced by the system can be input to block selection processing to identify features of the color document. Advantageously, the system thereby allows a conventional binary block selection system to accurately identify features of a color document. Moreover, information concerning the identified features, the frame, and the background colors can be stored and used to construct a substantial and editable representation of the document.

In another aspect, the present invention relates to a system to define a threshold binarizing area for binarizing a color image in which color pixel values corresponding to a color document are input, a core range of pixel values are determined from the input pixel values, a first number of pixel values within the core range of pixel values is calculated, a second number of pixel values within an outer layer of the core range of pixel values is calculated, and a threshold binarizing area is defined. In a case that the number of pixel values within a subject outer layer of the core range of pixel values is a local minimum value, the threshold binarizing area is defined as the subject outer layer and an area circumscribed by the subject outer layer. The resulting threshold binarizing area represents a range of colors approximating a background color of the color document. As a result, background pixels of the color document can be easily discerned by identifying pixels having values within the threshold binarizing area.

Therefore, the above system can be used to transform color pixel values of a color document to binary pixel values in which pixels having a value approximate to the background color are assigned values of "zero", and in which all other pixels are assigned values of "one".

In yet another aspect, the present invention relates to a hierarchical tree structure representing a document page which includes a plurality of nodes, each of which corresponds to a block of image data in the document page, and each of which contains feature data defining features of document image data of the corresponding block, wherein at least one node contains information regarding a color within the corresponding block, and wherein at least one node contains information regarding an artificial frame which represents an area of the document page. By virtue of the foregoing, a color document image can be accurately reconstructed and/or edited from a small amount of stored data.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

FIG. 6, comprising

FIG. 7 is a diagram illustrating color smoothing according to a preferred embodiment of the present invention.

FIG. 8, comprising FIG. 8A and FIG. 8B, is a flow diagram of process steps to define a threshold binarization area according to the present invention.

FIG. 11, comprising FIG. 11A and FIG. 11B, illustrates relationships between binarization layers and numbers of input pixels for use in conjunction with the present invention.

FIG. 21 is a view of binary image data residing in a buffer during color block selection according to the present invention.

DETAILED DESCRIPTION OF THE PREFERRED EMBODIMENTS

Figure 1:
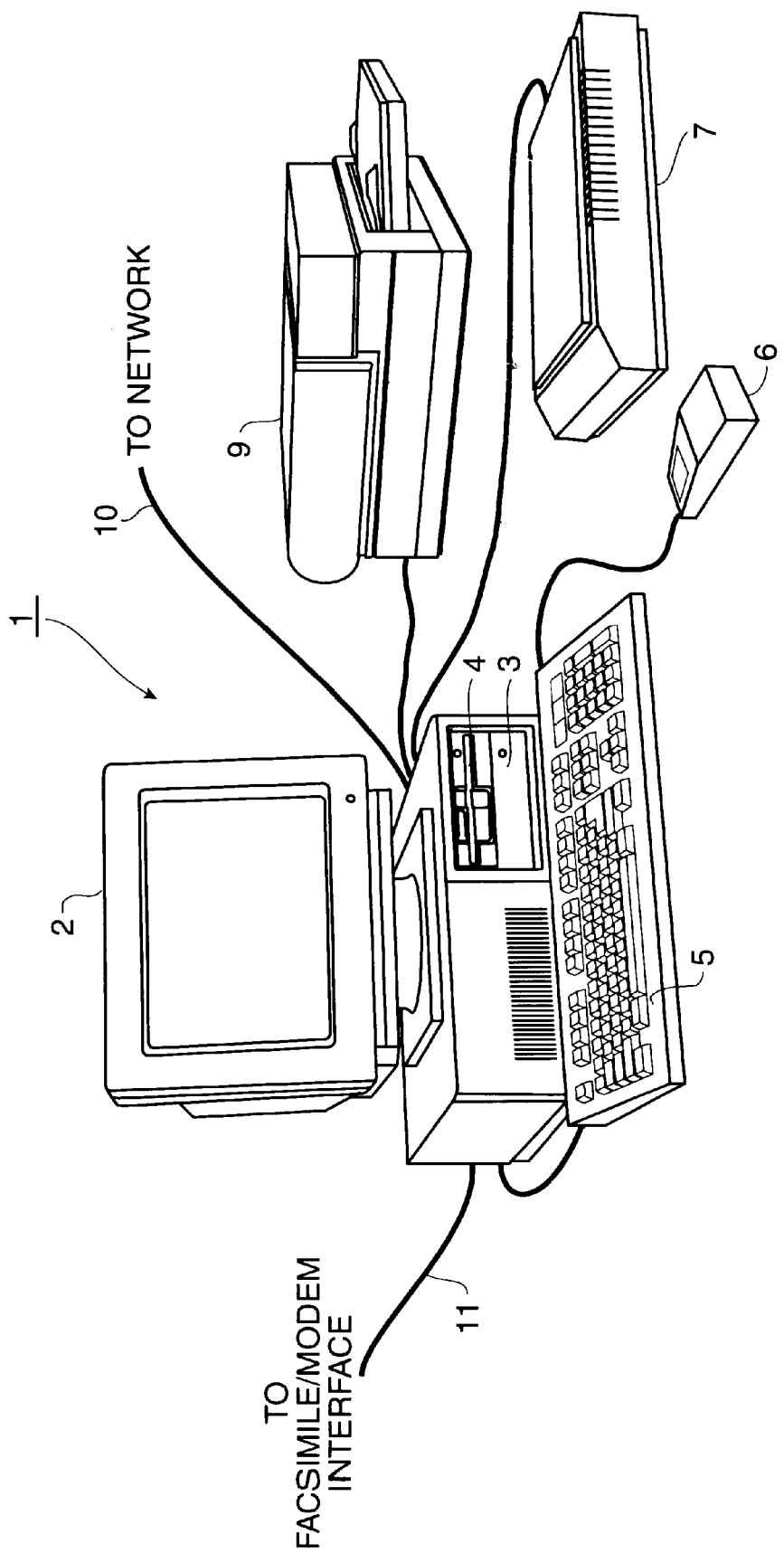
FIG. 1 is a view showing representative computing equipment embodying the present invention.

FIG. 1 is a view showing the outward appearance of representative computing equipment embodying a color block selection system according to the present invention.

Shown in FIG. 1 is computing equipment 1, such as an IBM PC or PC-compatible computer having a windowing operating system such as the Microsoft Windows98™ operating system. Computing equipment 1 is provided with either a monochromatic or color display monitor 2, using which computing equipment 1 displays images to a user. Computing equipment 1 is also provided with fixed disk drive 3 for storing data files and application program files, keyboard 5 for inputting text data and for manipulating objects displayed on display screen 2, and pointing device 6, such as a mouse, which is provided for pointing to and manipulating objects displayed on display screen 2.

Computing system 1 also includes floppy disk drive 4 for reading from and writing to a floppy disk. Document image files including color images, as well as computer-executable process steps embodying the present invention, may be stored either on fixed disk 3 or on a floppy disk inserted in floppy disk drive 4. Alternatively, document image files and/or computer-executable process steps may be obtained from a CD-ROM accessed via a CD-ROM drive (not shown).

Also provided with computing equipment 1 are network interface 10 for interfacing with a local area network, and facsimile/modem interface 11 for sending and receiving facsimile messages and other data files. Document image files and computer-executable process steps embodying the present invention may be accessed over a network via network interface 10. In addition, facsimile/modem interface 11 can also be used for retrieving images and/or computer-executable process steps from the World Wide Web ("Web").

Most typically, the applications stored on fixed disk 3, including a color block selection application according to the present invention, are stored to disk 3 after being downloaded from a computer-readable medium, such as a floppy disk, a CD-ROM, a network drive, or the Web.

A color document image may also be input by color scanner 7, which scans a color document in order to provide 24-bit color image data representing the document to computing equipment 1. The color image data preferably consists of 8-bits each of red, green, and blue values for each pixel in the document. However, other bit-lengths or color spaces can be used to represent a color document image to be analyzed according to the present invention.

Printer 9 is provided for outputting document images processed by computing equipment 1.

In operation, and under control of the windowing operating system, stored application programs, such as a color block selection application according to the present invention, are selectably activated to process and to manipulate stored data. In accordance with operator instructions, and based on the stored application programs, commands are issued to display images on screen 2, and to print the displayed images using printer 9.

Figure 2:
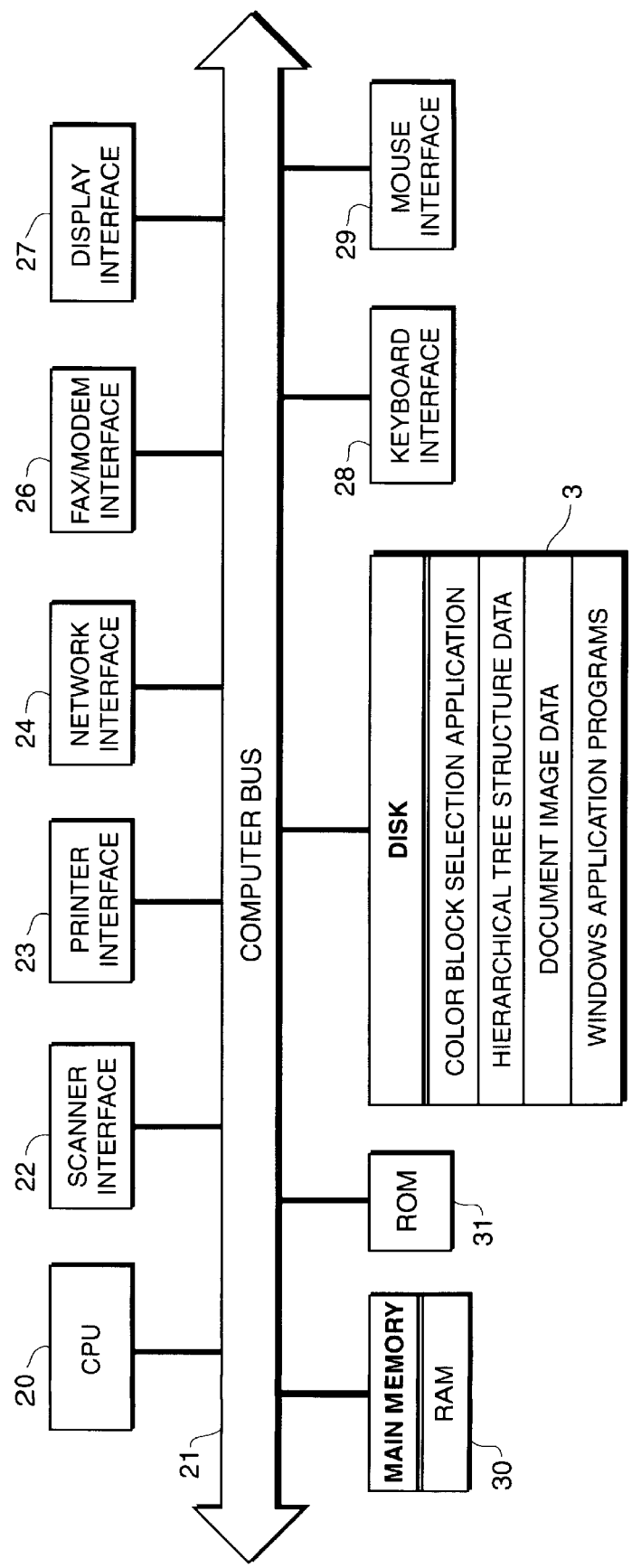
FIG. 2 is a block diagram illustrating the internal architecture of computing equipment embodying the present invention.

FIG. 2 is a detailed block diagram showing the internal construction of computing equipment 1. As shown in FIG. 2, computing equipment 1 includes a central processing unit (CPU) 20, such as a programmed microprocessor, interfaced to computer bus 21. Also interfaced to computer bus 21 are scanner interface 22, printer interface 23, network interface 24, fax/modem interface 26, display interface 27, keyboard interface 28, and mouse interface 29.

Main memory 30, such as random access memory (RAM), interfaces to computer bus 21 so as to provide CPU 20 with access to memory storage. In particular, when executing computer-executable process steps such as those stored on disk 3, CPU 20 loads those steps from disk 3 or other storage media into main memory 30 and executes those process steps out of main memory 30. Main memory 30 also provides buffer storage for storing data used during execution of color block selection according to the present invention.

Read-only memory (ROM) 31 is used for storing computer-executable process steps, such as those used during boot-up, or basic input/output operating system (BIOS) sequences for operation of, for example, keyboard 5.

Figure 3:
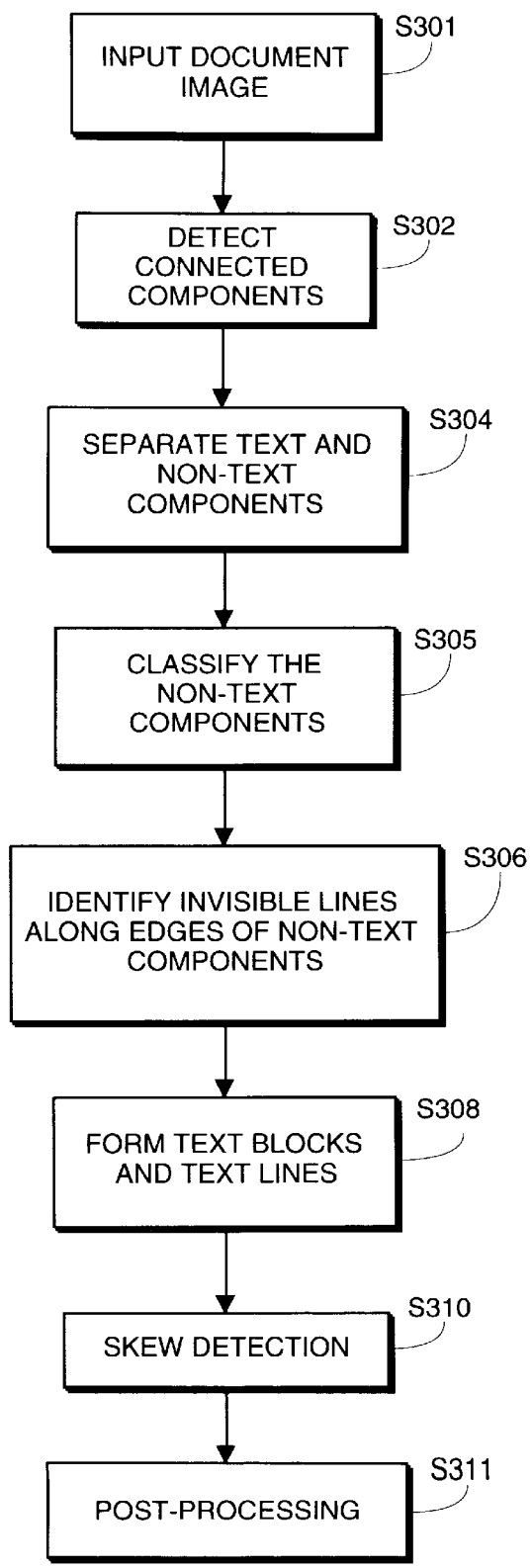
FIG. 3 is a flow diagram of general process steps to perform block selection processing.

The present invention, as described above, preferably utilizes a black/white block selection application in order to analyze color documents. As such, the present invention may be practiced by upgrading, rather than replacing, existing black/white block selection applications. In this regard, FIG. 3 is a flow diagram of process steps to perform black/white block selection as described in aforementioned U.S. Pat. Nos. 5,680,479 and 5,588,072.

Generally, the process steps of FIG. 3 are used to input a document image, to detect connected components within the document image, to separate text and non-text connected components, to classify non-text connected components, to identify white areas along edges of non-text components, to form text blocks and text lines, to detect skew of the input image, and to post-process the image.

Specifically, in step S301 of FIG. 3, bitmapped pixel data of a document image is input into computing system 1 and is stored in disk 3 or in main memory 30. Using conventional block selection systems, the pixel data must be binary pixel data, that is, black/white pixel data.

In step S302, the input pixel data is analyzed so as to detect connected components within the document image. A connected component is a group of black pixels that is completely surrounded by white pixels. The detected connected components are rectangularized, or "blocked", by defining, for each connected component, a smallest rectangle circumscribing the connected component.

The connected components are roughly classified into text connected components and non-text connected components in step S304. Generally, the classification is based on a size of the rectangle circumscribing each connected component and on the assumption that non-text connected components are larger than text connected components. Detailed descriptions of steps S301, S302, and S304 are located within U.S. Pat. Nos. 5,588,072 and 5,680,479.

Next, in step S305, connected components classified as non-text in step S304 are further analyzed to determine subclassifications. Such subclassifications include line, joint-line, picture, line art, frame, table, or unknown (none of the above). Again, the subclassification is based on criteria thresholds formulated mathematically and calculated dynamically based on size, width, and relative positions of connected components being analyzed.

After subclassification, invisible lines are identified along edges of non-text connected components in step S306. For example, a vertical invisible line, or region of white pixels, may be located between two picture connected components. The invisible line can be used in step S308, described below, to determine whether text connected components located below the picture components should be group together or within separate columnar blocks.

In this regard, flow proceeds from step S306 to step S308, in which text blocks are formed from the text connected components classified in step S304. More specifically, close horizontal and vertical neighbors of each text connected component are aggregated into text blocks based on a statistical analyses of horizontal and vertical gaps between neighboring text components. Any formed text blocks are further analyzed so as to form text lines. U.S. Pat. No. 5,588,072 contains a detailed description of a preferred embodiment of step S308.

Next, in step 8310, a skew of the inputdocument image is detected and, if the skew angle exceeds a predefined maximum, an error code is output. The error code signals to the user that the input document page is too skewed to complete block selection processing.

If the skew is within acceptable limits, flow advances to step S311, in which post-processing is performed. Post-processing is intended to result in a more compact and "clean" block representation of the document image, and can be tailored to suit particular types of subsequent processing, such as character recognition, data compression, and the like. Generally, however, post-processing involves associating text blocks with other text or non-text blocks.

Execution of the FIG. 3 process steps produces location information of data within a document image, as well as data type information of the data within the document image. As a result, the FIG. 3 process steps can be used in conjunction with an optical character recognition system so as to recognize characters represented by image data, to convert the characters into an ASCII format, and to store the data in an ASCII file. In addition, the process steps enable image data within the document to be extracted, subjected to data compression, and stored.

Figure 4:
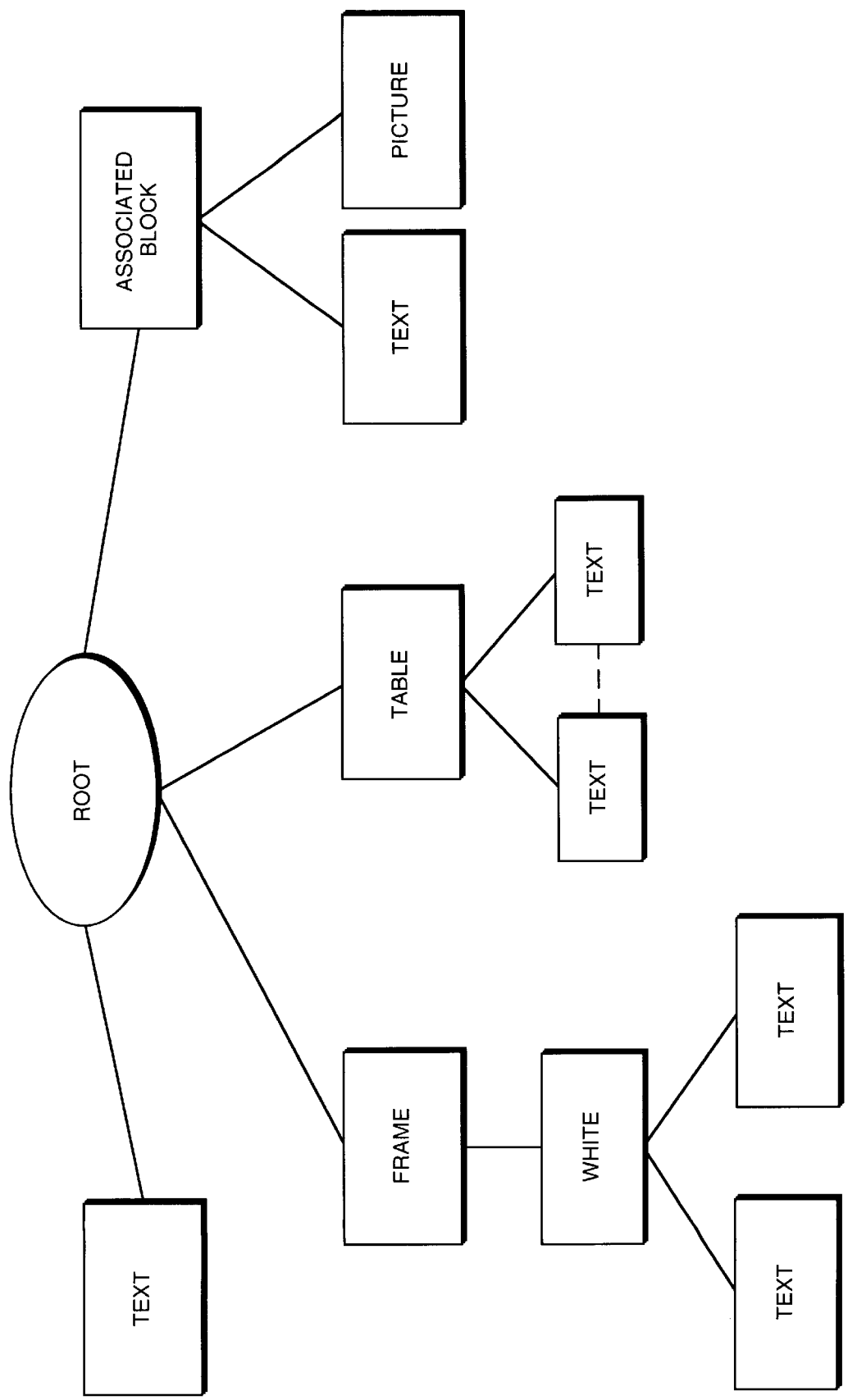
FIG. 4 is a representation of a hierarchical tree representing a document image.

Preferably, and as described in U.S. Pat. Nos. 5,588,072 and 5,680,479, the information produced by a block selection application is stored in a hierarchical tree structure such as that shown in FIG. 4. FIG. 4 shows that a document page is represented by a root node. Descending from the root node are other nodes representing blocks of image data identified within the document. Each node stores as least coordinates of a rectangularized block surrounding connected components within a block represented by the node, as well as the type of data within the block. As also shown in FIG. 4, image data located within a block of other image data is represented as a "child" node descending from a "parent" node representing the other image data. Parent nodes may also be used to indicate an association between blocks of data, for example, between a block of picture data and a block of text data.

A hierarchical tree structure such as that shown in FIG. 4 is stored so as to assist in reconstructing the document page from the location information and data type information stored in the hierarchical tree structure. Additionally, ASCII files representing identified text within the document image can be used to recreate text portions of the document at appropriate locations specified by the location information. Similarly, compressed picture data from the original document can be decompressed and included in a reconstructed document at an appropriate location.

It should be noted that the present invention is not limited to use in conjunction with the above-described block selection system, and that any other page segmentation system which operates on binary image data may be used in conjunction with the present invention.

Figure 5:
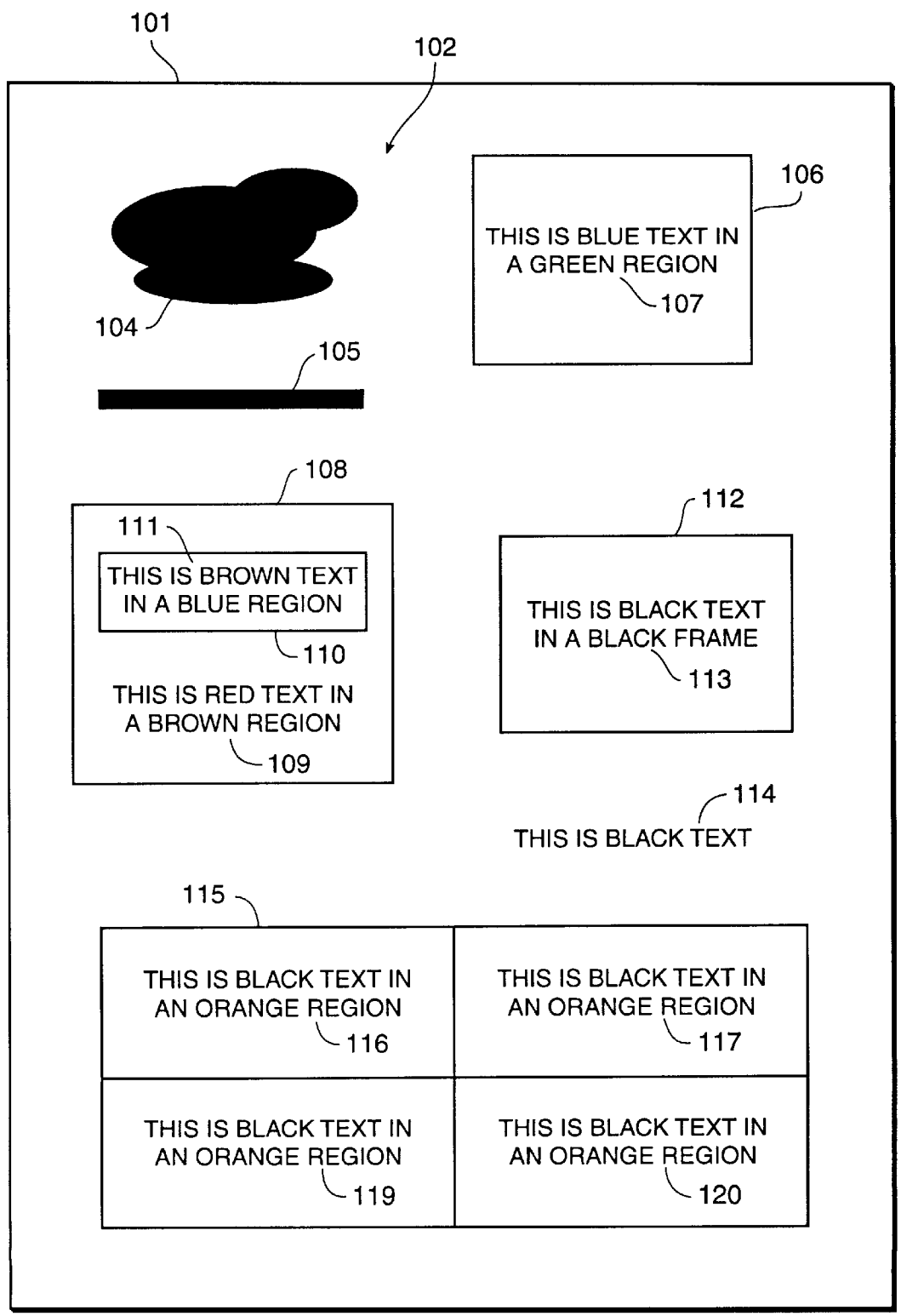
FIG. 5 is a view of a color document for subjection to color block selection according to the present invention.

FIG. 5 is a view of color document 101 for input to a system according to the present invention. Document 101 contains background area 102 having a yellow background color. For purposes of the foregoing discussion, also located within color document 101 is color picture 104, dark blue line 105, green region 106 containing blue text 107, brown region 108 containing red text 109, and blue region 110 containing brown text 111. Also within document 101 are black frame 112 containing black text 113, black text 114 and table 115, which consists of a black frame surrounding an orange region including black text 116, 117, 119 and 120. It should be noted that regions 106, 108 and 110 are colored to indicate that the text located within these regions is not associated with one another or with text 113 or text 114. It should also be noted that regions 106, 108 and 110 are not actually surrounded by black frames, but that the surrounding black pixels shown in FIG. 5 merely indicate boundaries of regions 106, 108 and 110, which are not otherwise easily shown using a black/white figure.

Figure 6A:
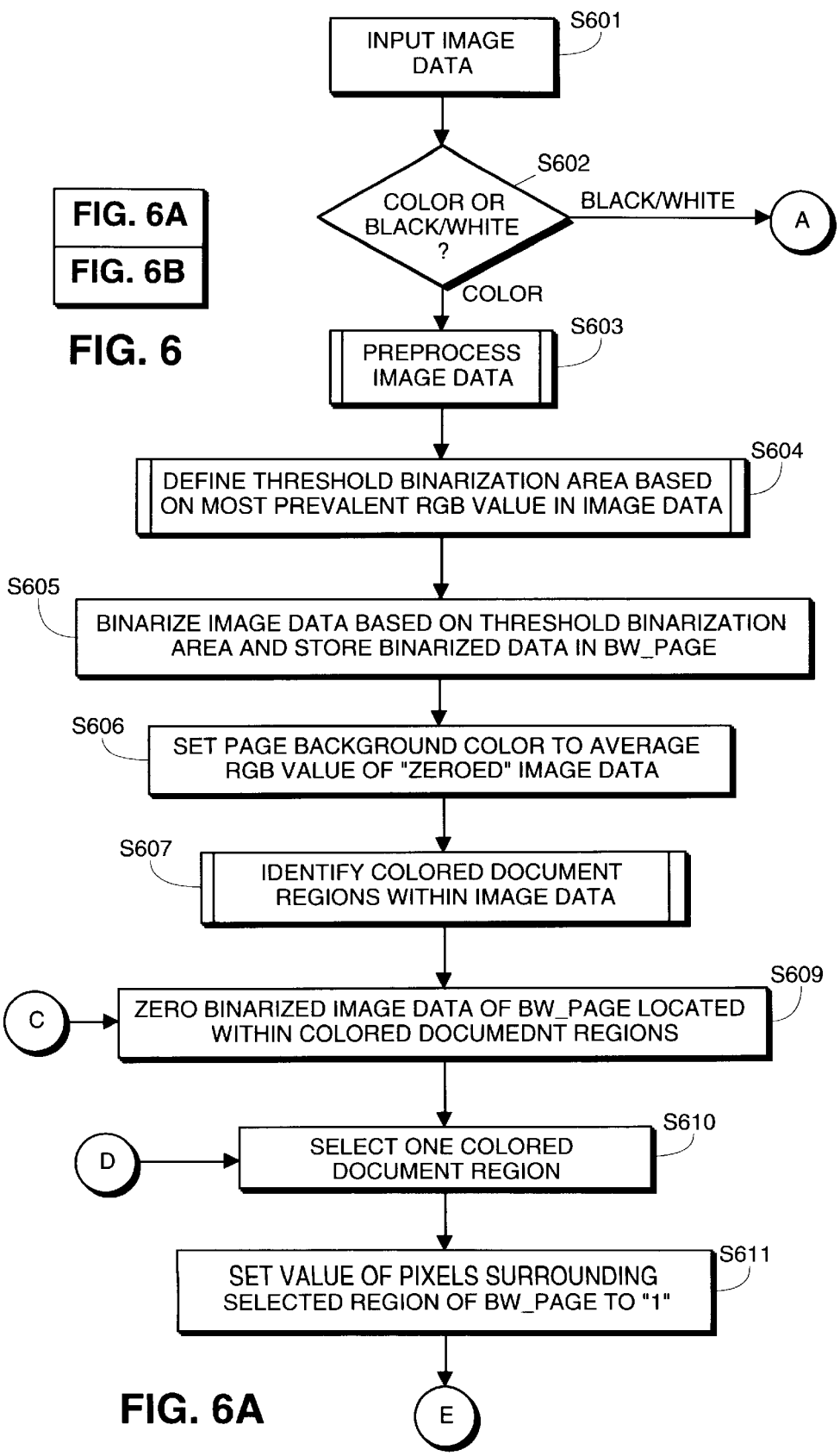
FIG. 6A and FIG. 6B, is a flow diagram of process steps to perform color block selection according to the present invention.
Figure 6B:
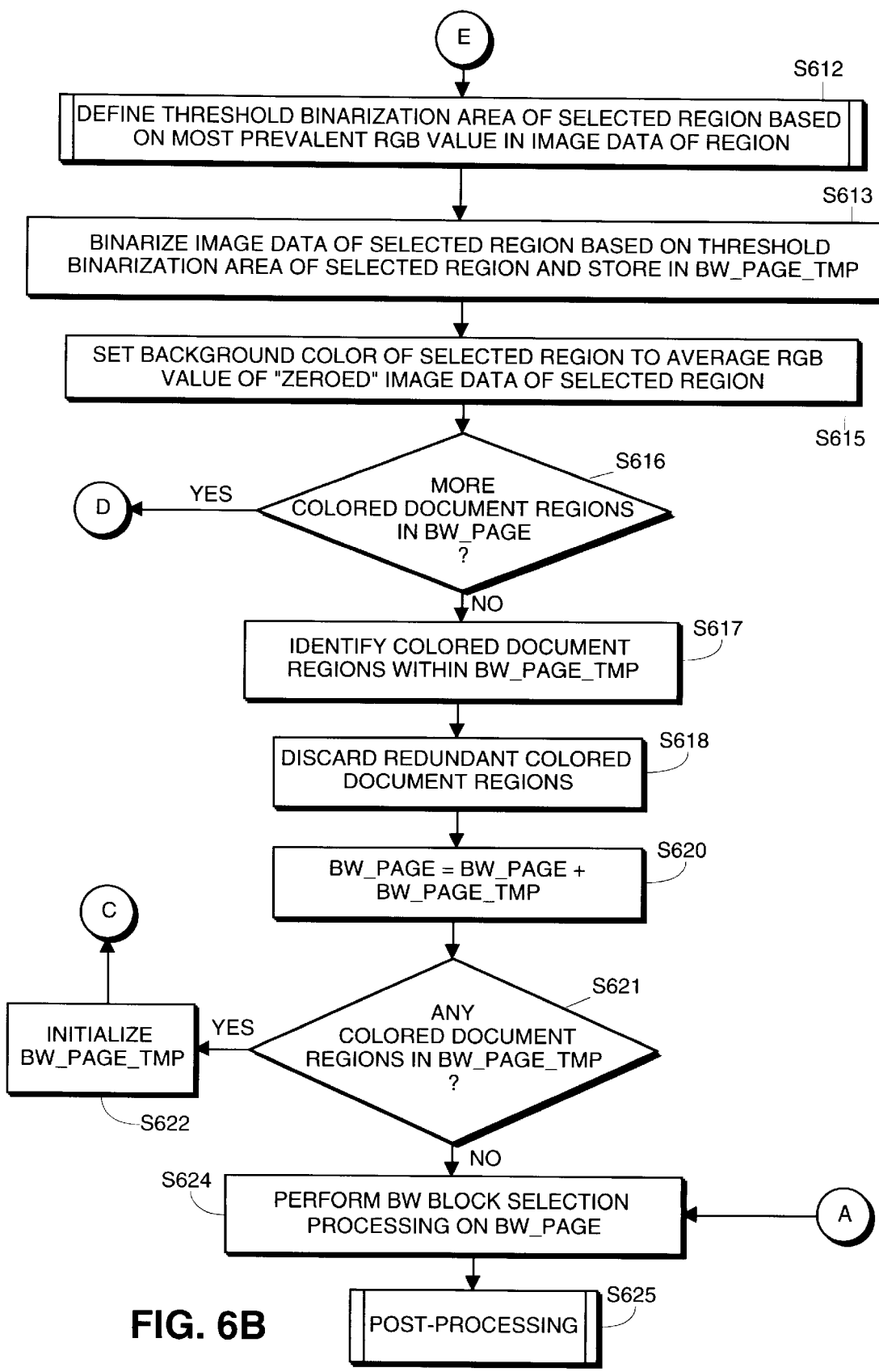

FIG. 6 is a flow diagram of process steps to process a color document such as color document 101 according to the present invention. Preferably, the process steps of FIG. 6 are embodied as computer-executable process steps stored on a computer-readable medium, which are transferred to main memory 30 and executed therefrom by CPU 20.

Briefly, the FIG. 6 process steps include steps to input primary color values representing a color image, to calculate a threshold binarizing range based on the input values, to binarize the input values into binary values based on the threshold binarizing range, to identify a colored region within the image, to define a frame surrounding the identified colored region, to calculate a second threshold binarizing range based on input primary values corresponding to the colored region, and to binarize the input primary values corresponding to the colored region based on the second threshold binarizing range.

In particular, the FIG. 6 process steps begin at step S601, in which image data of a color document is input. As described above, scanner 7 can be used to scan color documents such as document 101 to produce bitmapped 24-bit color data in step S601. Of course, other well-known methods to input color image data into computing system 1 may be utilized in step S601. Next, in step S602, it is determined whether the input image data represents color image data or black/white image data. If black/white, flow proceeds to step S624, in which black/white block selection processing such as that described with respect to steps S302 to S310 of FIG. 3 is performed.

Figure 7:
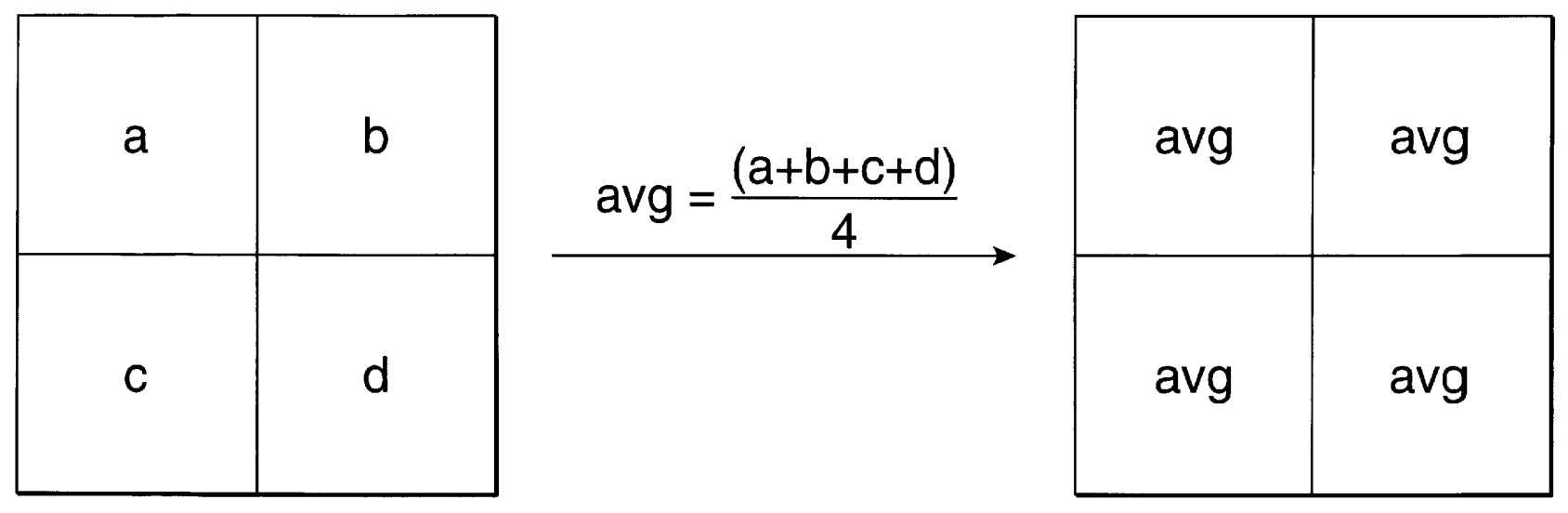

If, in step S602, it is determined that the input image data is color image data, flow proceeds to step S603 for preprocessing the image data. Preprocessing is used to smooth the values of the input color image data in order to address uneven scanning of the color document and to remove noise from the image data. FIG. 7 illustrates preprocessing according to a preferred embodiment of the present invention. As illustrated, input values of a 2×2 pixel area are averaged and the value of each pixel in the area is replaced with the average value. In a case that the input image data is represented using three 8-bit values each corresponding to one of red, green or blue colors, the preprocessing illustrated in FIG. 7 is executed for each primary color separately. Accordingly, each pixel in the 2×2 matrix will be assigned an average red value, an average green value, and an average blue value. It should be noted that other types of preprocessing may be applied to the input image data in step S603.

Figure 8B:
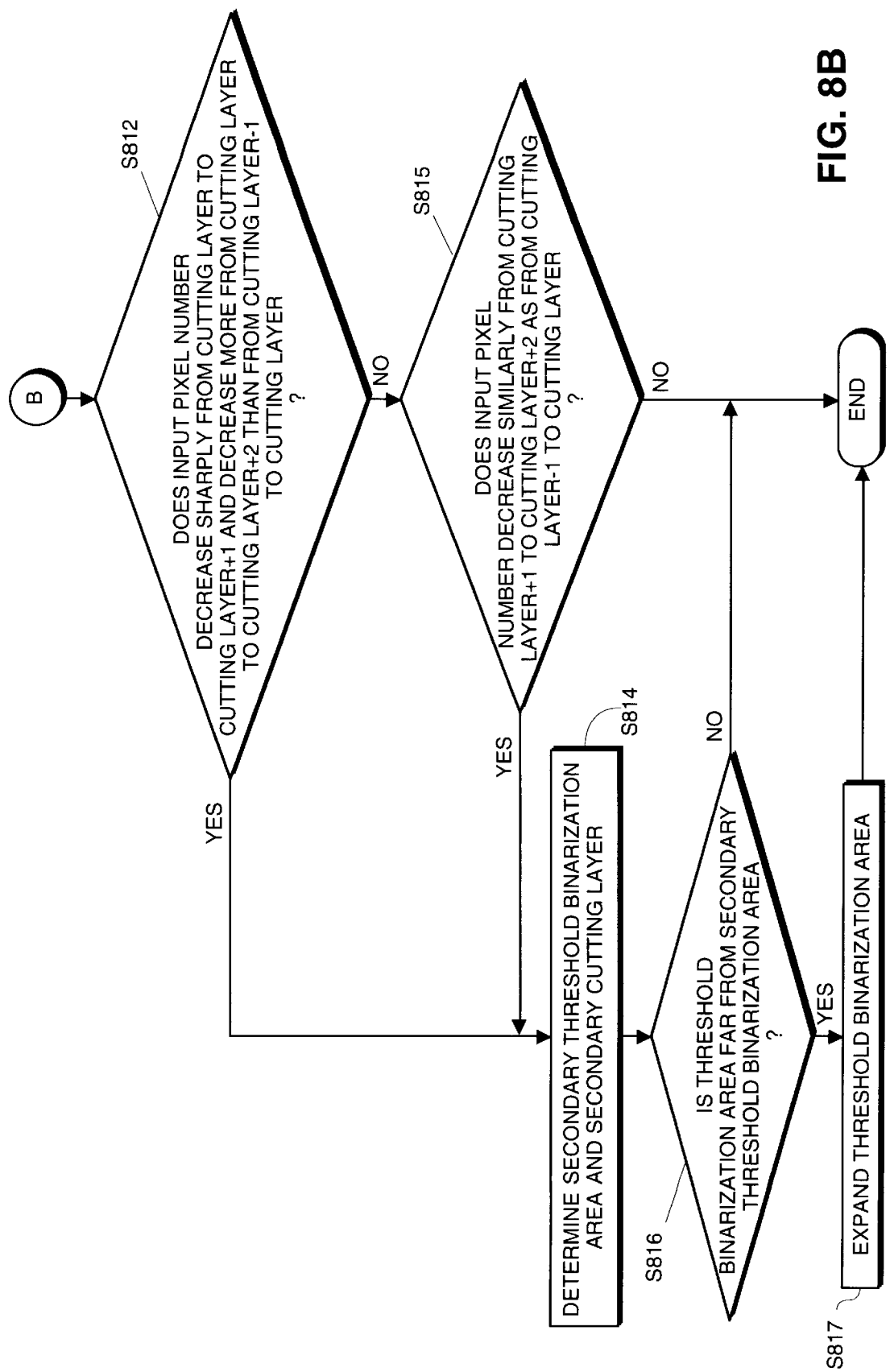

Next, in step S604, a threshold binarization area is defined based on a most prevalent RGB value in the input image data. FIG. 8 is a flow diagram of process steps to define such a threshold binarization area, the process steps generally including steps to input pixels values corresponding to a color image, to determine a core range of pixel values based on the input pixels values, to calculate a number of the pixel values within the core range of pixels values, to calculate a number of the pixel values with an outer layer of the core range of pixels values, and to define a threshold binarizing area, wherein, in a case that the number of pixel values with a subject outer layer of the core range of pixels values is a local minimum value, the threshold binarizing area is defined as the subject outer layer and an area circumscribed by the subject outer layer.

Figure 9:
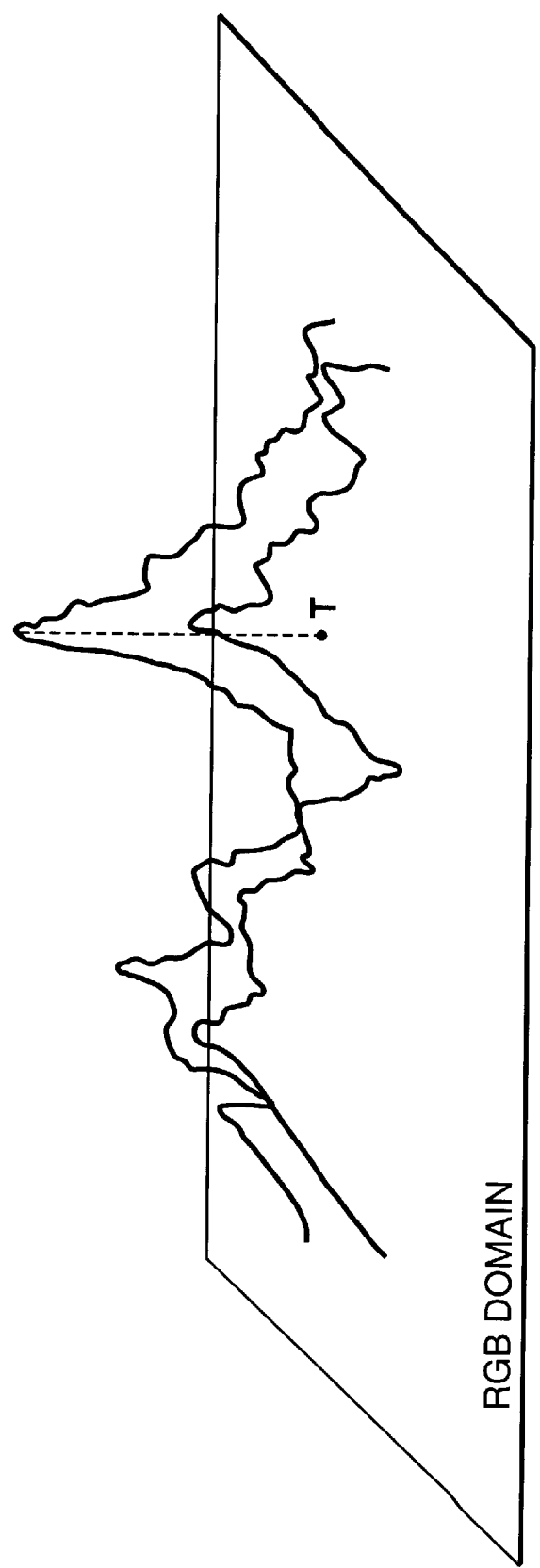
FIG. 9 is a view of a histogram of input pixel values calculated in the RGB domain.
Figure 10:
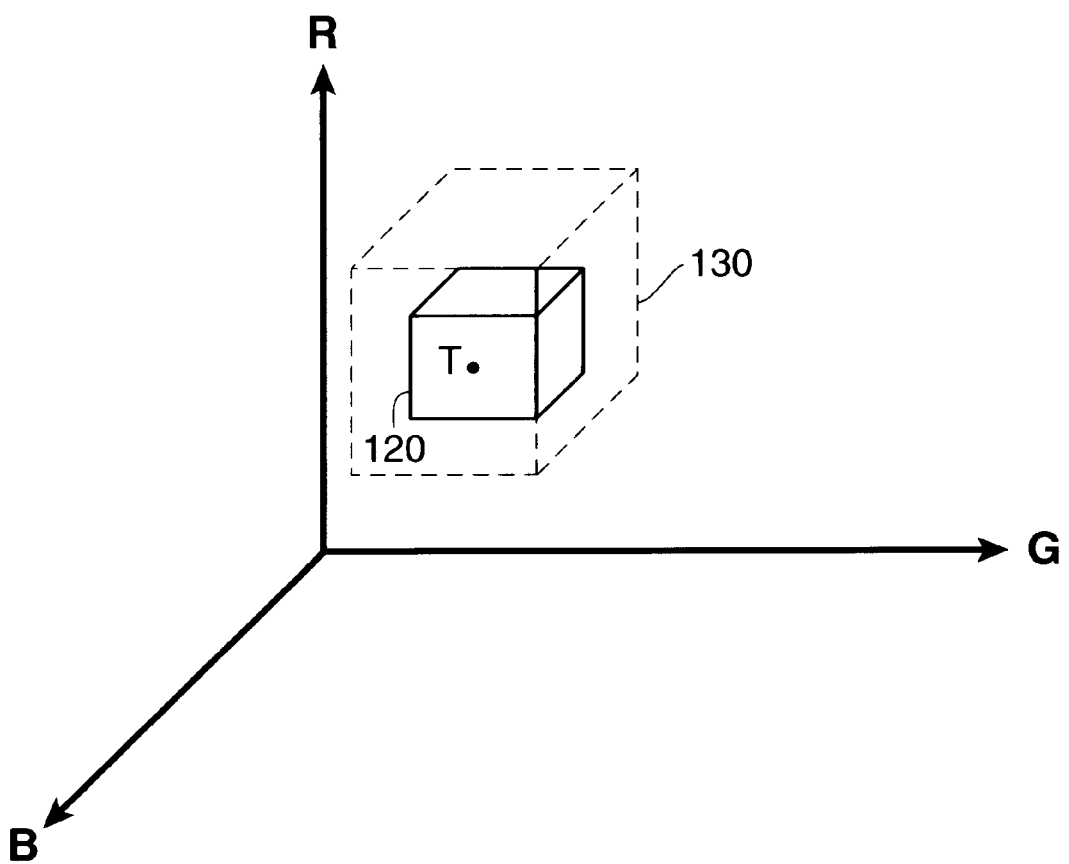
FIG. 10 is a view illustrating definition of a threshold binarizing area according to the present invention.

More specifically, the FIG. 8 steps begin at step S801, wherein a histogram of RGB values within the input image data is calculated. FIG. 9 shows such a histogram of RGB values. As shown in FIG. 9, the histogram is plotted in the RGB domain, with each point representing a number of input pixels having a particular RGB value. As also shown, RGB value T is possessed by more input pixels than any other RGB value. Accordingly, in step S802, value T is used to determine the core threshold binarization area. FIG. 10 shows value T mapped to a three-dimensional RGB color space. In the present embodiment, core threshold binarization area 120 is defined by a cube obtained by moving one unit in each of the R, G and B directions from threshold value T. It should be noted, however, that a core binarization area according to the present invention may be represented by any 3-dimensional shape within any color space.

Flow proceeds from step S802 to step S804, in which a number of input pixels having values within the core threshold binarization area is calculated. In this regard, the FIG. 9 histogram may be used, in conjunction with the RGB values within the core binarization area, to calculate the number desired in step S804. Next, in step S805, an outer layer is added to the core threshold binarization area. As shown in FIG. 10, outer layer 130 is defined by extending each surface of area 120 by a specified amount. The number of input pixels having values within area 130 is calculated in step S806. In this regard, it should be noted that the number calculated in step S806 corresponds only to pixels having values located within outer layer 130, and not to those pixels having values located within area 120.

In step S807, it is determined whether a valley point exists within a plot of a relationship between outer layers and number of input pixels. FIG. 11A shows such a plot, in which the horizontal axis indicates a layer number and the vertical axis indicates a number of pixels located within a particular layer. As shown in FIG. 11A, no valley point exists within the plotted relationship after initial execution of step S806. Accordingly, flow proceeds to step S810, wherein it is determined whether N layers have been added to the core threshold binarization area. As will be understood below, N represents a default layer at which existence of a valley point is assumed. If N layers have not yet been added, flow returns to step S805.

Flow proceeds between steps S805 to S810 as described above, adding outer layers to a threshold binarization area and calculating a number of pixels having values in the respective outer layers until, at step S807, a valley point is recognized in the plot of outer layers versus number of input pixels. FIG. 11B illustrates a relationship in which a valley point is located in step S807. As shown, after calculation of a number of pixels having values with an outer layer 4, a valley point is located at outer layer 3. Accordingly, flow proceeds to step S809, wherein outer layer 3, which is the outer layer corresponding to the valley point, is set as the "cutting layer". If, prior to locating a valley point in step S807, it is determined in step S810 that N layers have been added to the core threshold binarization area, the Nth layer is set, in step S811, as the cutting layer.

After the cutting layer is set in step S809 or step S811, flow proceeds to step S812. Step S812 is used to determine whether the cutting layer, and as a result, the threshold binarization area, should be expanded to include more colors within the background color. Specifically, in step S812, it is determined whether a corresponding input pixel number decreases sharply from the cutting layer to a first layer above the cutting layer and whether a corresponding input pixel number decreases more from the cutting layer to a second layer above the cutting layer than from the layer immediately below the cutting layer to the cutting layer. If so, the cutting layer is not expanded and flow proceeds to step S814.

If the determination in step S812 is negative, flow proceeds to step S815. At step S815, it is determined whether a corresponding input pixel number decreases similarly from a layer above the cutting layer to a second layer above the cutting layer as from the layer below the cutting layer to the cutting layer. If so, flow also proceeds to step S814. If not, the FIG. 8 flow terminates.

In step S814, a secondary threshold binarization area and secondary cutting layer are determined. In this regard, steps S802 to S815 are repeated with respect to a secondary core threshold binarization area. Accordingly, the secondary core threshold binarization area may be determined from the FIG. 9 histogram by locating a local maximum value other than value T.

Figure 12:
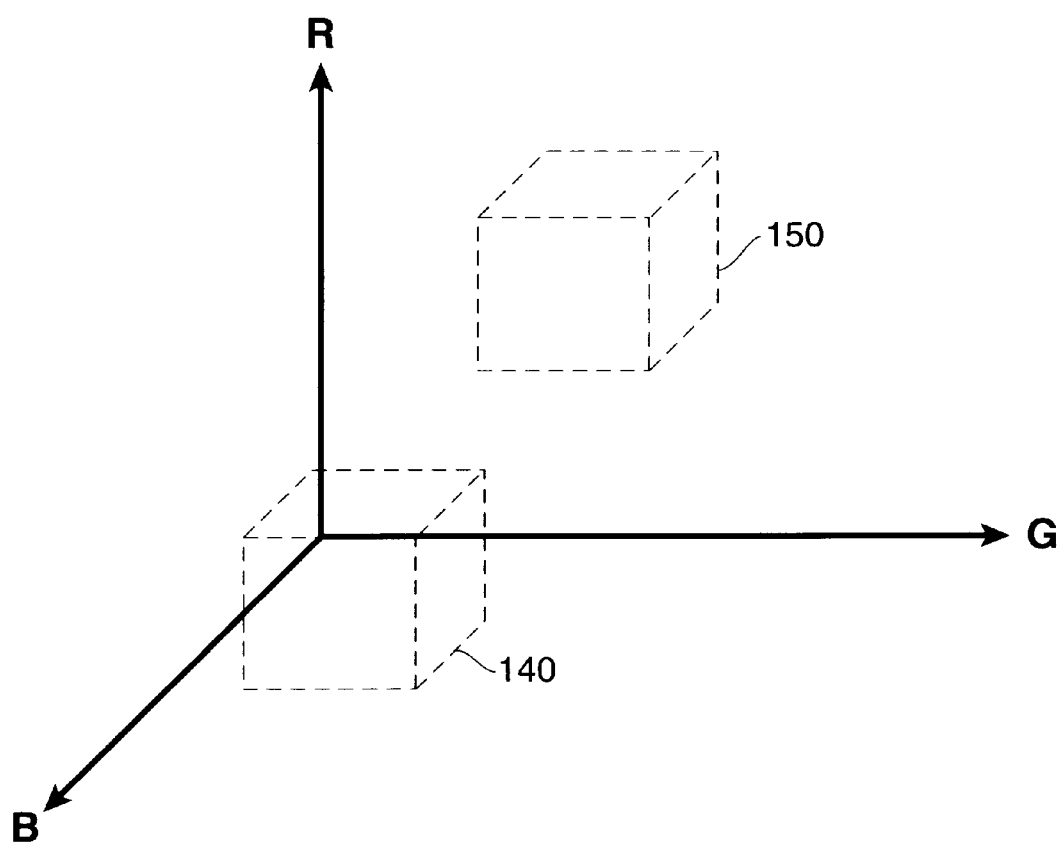
FIG. 12 is a view illustrating definition of a threshold binarizing area according to the present invention.

After step S814, two threshold binarization areas have been determined. Two such threshold binarization areas are illustrated in FIG. 12, with area 140 representing a primary threshold binarization area and area 150 representing a secondary threshold binarization area. Flow proceeds from step S814 to step S816, wherein it is determined if the primary threshold binarization area is far from the secondary threshold binarization area. In a preferred embodiment, it is determined whether the distance between the primary threshold area and the secondary threshold area is greater than a width of the primary area cutting layer plus a width of the secondary area cutting layer plus an offset. If not, the FIG. 8 flow terminates. If so, then in step S817 the primary binarization area is expanded in each direction by a value equal to the offset. The FIG. 8 flow thereafter terminates.

After completion of the FIG. 8 process steps, a primary threshold binarization area is defined which represents a background color of the input color document. Accordingly, the primary threshold binarization area can be used, as described below, to binarize background pixel values to a zero value.

As described above, the present invention utilizes a three-dimensional threshold binarization area. In contrast, one conventional binarization method consists of converting the input image data into grayscale data having a value of 0 to 255. The converted data would then be binarized according to a value between 0 and 255. One disadvantage of this alternative method is that several RGB values may be mapped into a single grayscale value. As such, each of the several RGB values would be binarized identically. Therefore, although one of the RGB values may be a foreground value and another of the RGB values a background value, both values would be identically binarized.

Figure 13:
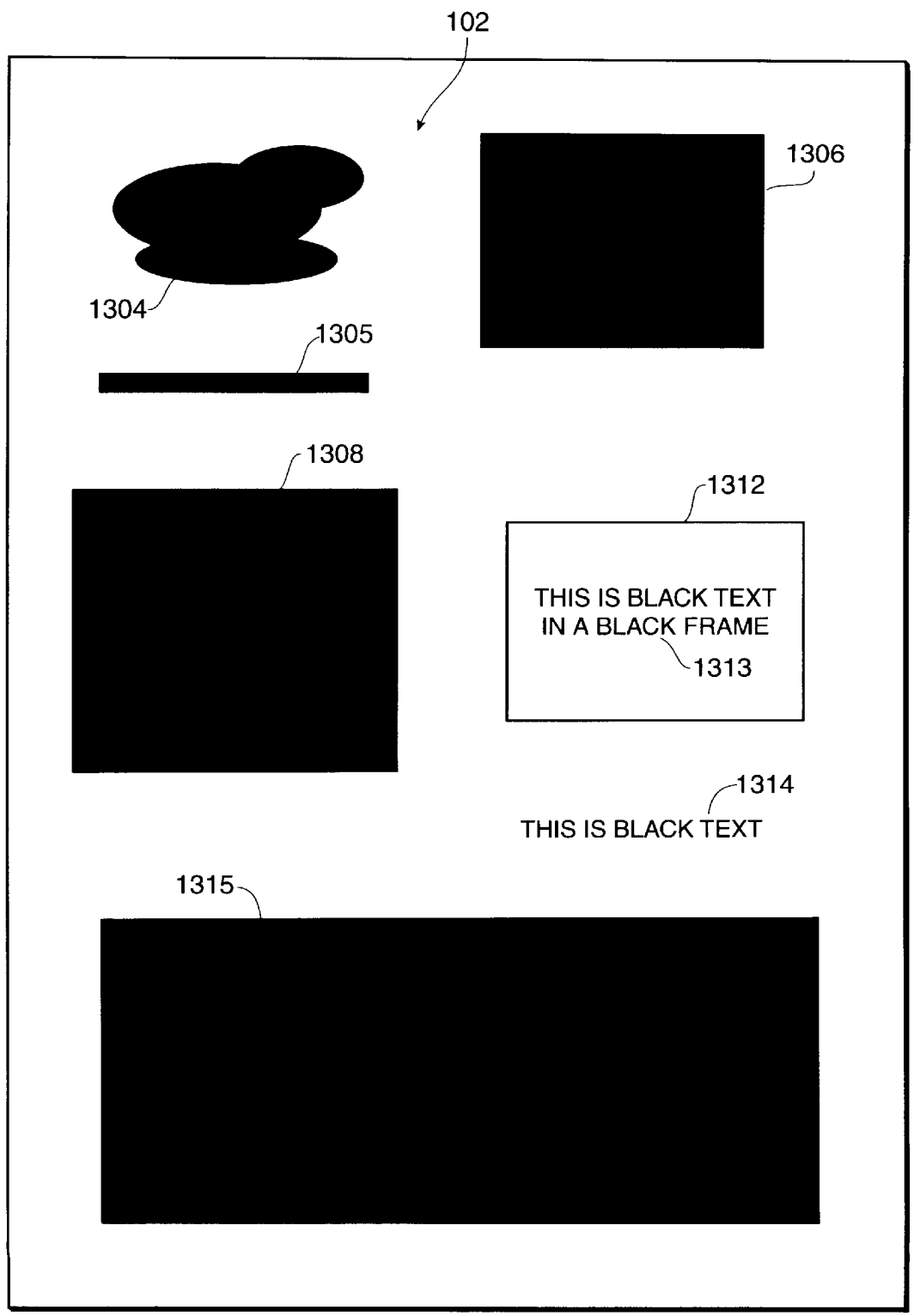
FIG. 13 is a view of binary image data residing in a buffer during color block selection according to the present invention.

Returning to the FIG. 6 flow, flow continues from step S604 to S605, wherein the input image data is binarized based on the primary threshold binarization area and the thus-binarized data is stored in a buffer, hereafter called BW_Page. In order to binarize the image data based on the threshold binarization area, values of each pixel in the input image data are compared with the threshold binarization area. If a pixel value falls within the threshold binarization area, the pixel value is zeroed, or, in other words, reassigned a value of zero. Accordingly, if the pixel value does not fall within the threshold binarization area, the pixel is assigned a value of one. FIG. 13 shows the contents of BW_Page after execution of step S605. As shown in FIG. 13, background area 102 contains pixels assigned a zero value, and the pixels representing image data of various colors outside the threshold binarization area have each been assigned a value of one.

Next, in step S606, the background color of page 101 is set to the average RGB value of each input pixel zeroed in step S605. This page background color is used to store a representation of document 101, as will be described below. It should be noted that the page background color may also be determined in step S606 based on core threshold value T determined in step S802, or based on an average value of each RGB value in the threshold binarization area. However, superior results have been found using the first-described method for determining page background color.

Figure 14:
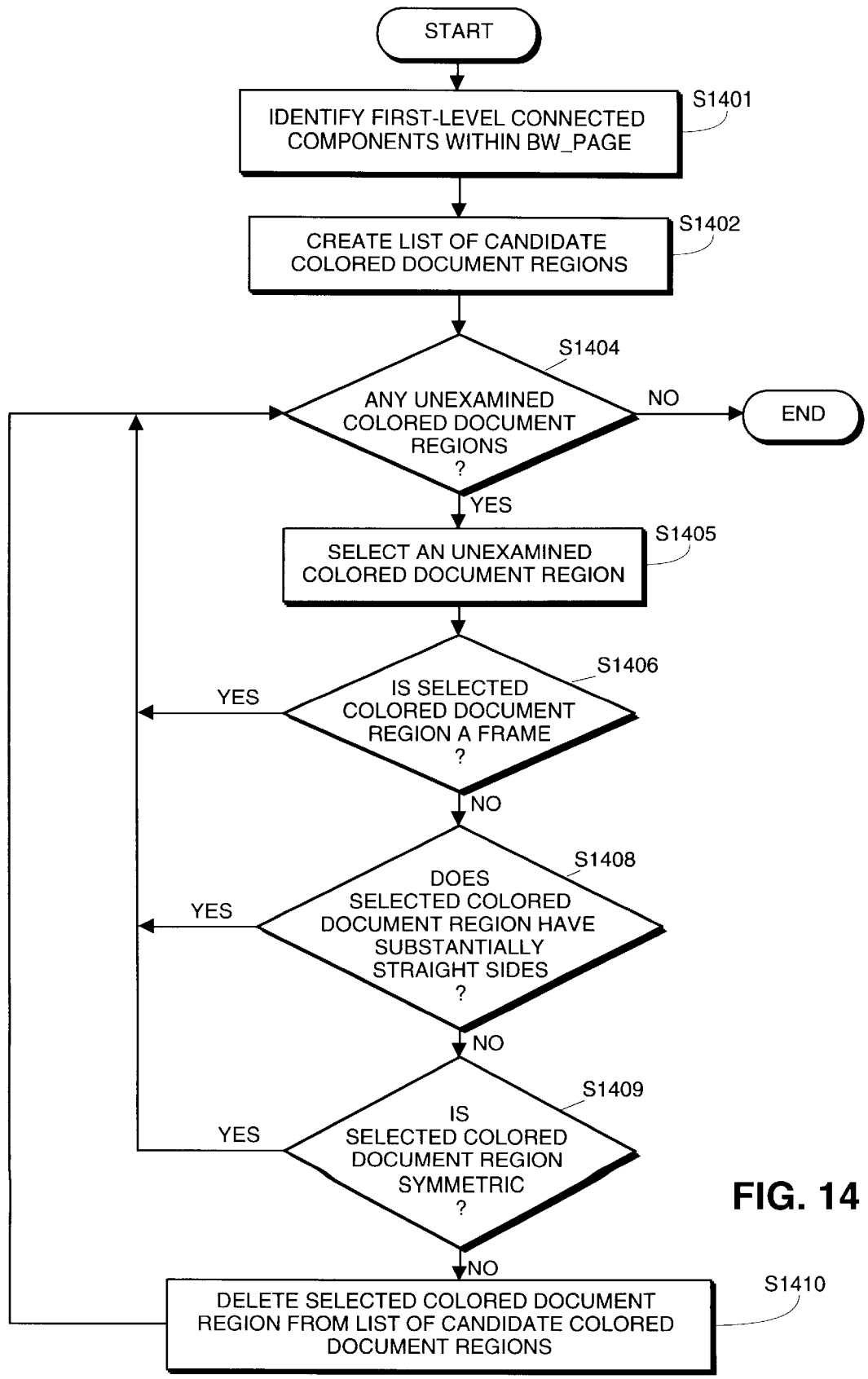
FIG. 14 is a flow diagram of process steps to identify colored document regions according to the present invention.

In step S607, colored document regions within the input image data are identified. FIG. 14 is a flow diagram of process steps to identify colored document regions according to step S607. Again, these process steps are preferably loaded into main memory 30 and executed therefrom by CPU 20.

The FIG. 14 flow begins at step S1401, in which first level connected components within BW_Page are identified. First level connected components are those which are not contained within any other connected components. In this regard, with respect to FIG. 13, picture 1304, line 1305, region 1306, region 1308, frame 1312, text 1314, and table 1315 are identified in step S1401 as first level connected components within BW_Page.

Next, in step S1402, a list of candidate colored document regions is created from the identified first level connected components. In a preferred embodiment, the list of candidate colored document regions is determined according to a size of the identified first level connected components. Generally, if an identified first level connected component is greater than a size indicative of a text character or a line, the first level connected component is added to the list of candidate colored document regions. Preferably, the list of candidate colored document regions includes coordinates of a rectangle circumscribing each candidate colored document region. In the present example, the list of candidate colored regions created in step S1402 includes rectangular regions circumscribing picture 1104, region 13OH, region 1308, frame 1312, and table 1315.

In step S1404, it is determined whether any colored document regions have not yet been examined. If no such regions exist, the FIG. 14 flow terminates. If one or more of such regions exist, flow proceeds to step S1405, wherein an unexamined colored document region is selected. In step S1406, it is determined whether the selected colored document region is a frame. For this purpose, a frame is defined as a four-sided region with substantially horizontal and vertical sides. If the selected region is such a frame, such as in the case of regions 1306, 1308, 1312, and 1315, flow returns to step S1404, wherein it is determined whether any colored document regions from the list of candidate colored document regions have yet to be examined. If not, flow proceeds to step S1408.

Figure 15:
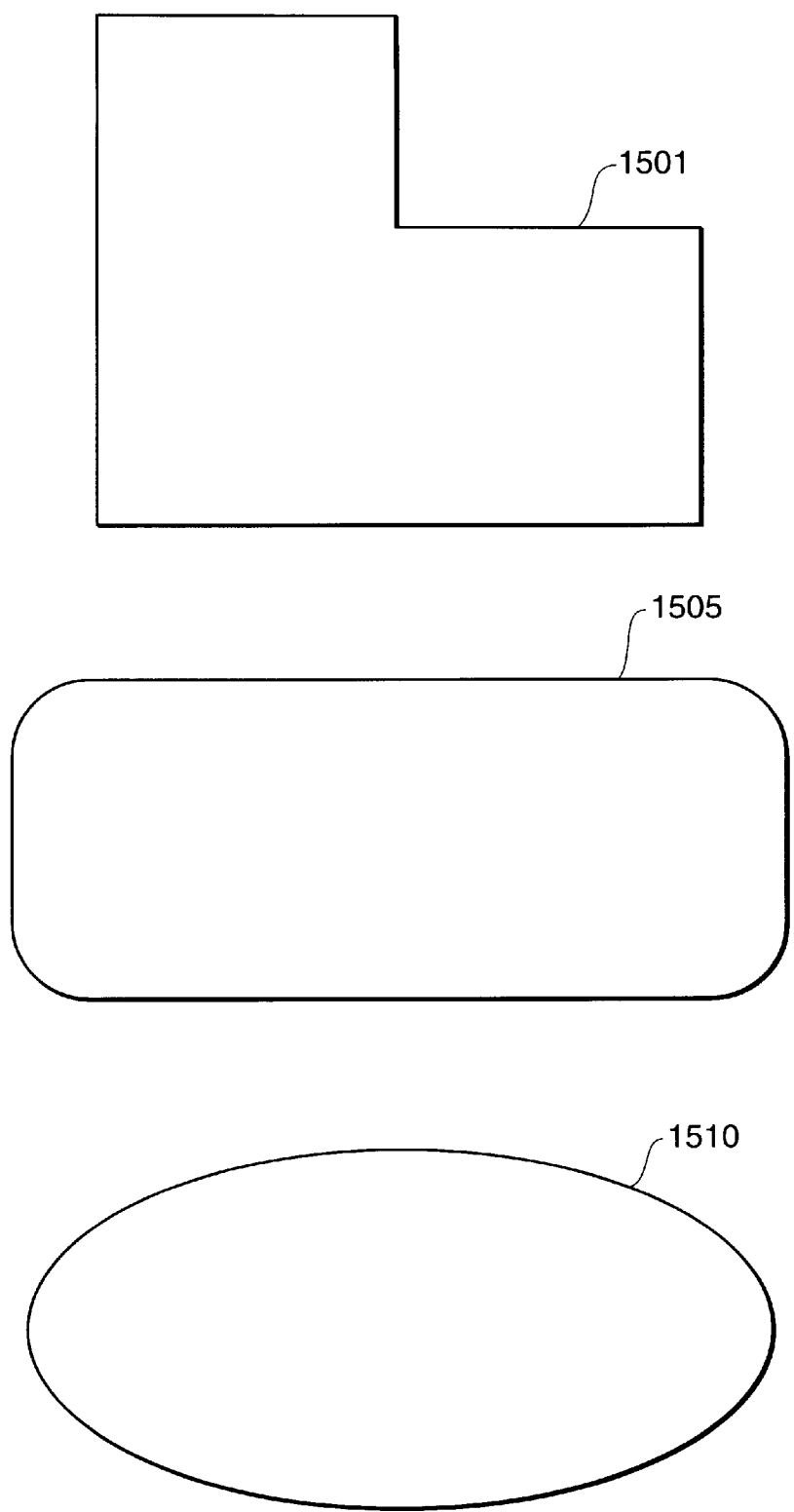
FIG. 15 is a view of image data of colored document regions according to the present invention.

In step S1408, it is determined whether the selected colored document region has substantially straight vertical and horizontal sides. If so, such as in the case of region 1501 of FIG. 15, flow returns to step S1404. If not, flow continues to step S1409, wherein it is determined whether the selected colored document region is symmetric. Again, if the selected colored document region is symmetric, such as regions 1505 and 1510 of FIG. 15, flow returns to step S1404, and, if the selected colored document region is not symmetric, flow proceeds to step S1410. At step S1410, the selected colored document region is deleted from the list of candidate colored document regions. By virtue of the FIG. 14 process steps, a list of colored document regions is produced.

Steps S1406, S1408, and S1409 are advantageously ordered from least-complex to most-complex processing. Such an arrangement reduces an amount of time and resources necessary to produce a list of colored document regions within BW_Page.

Figure 16:
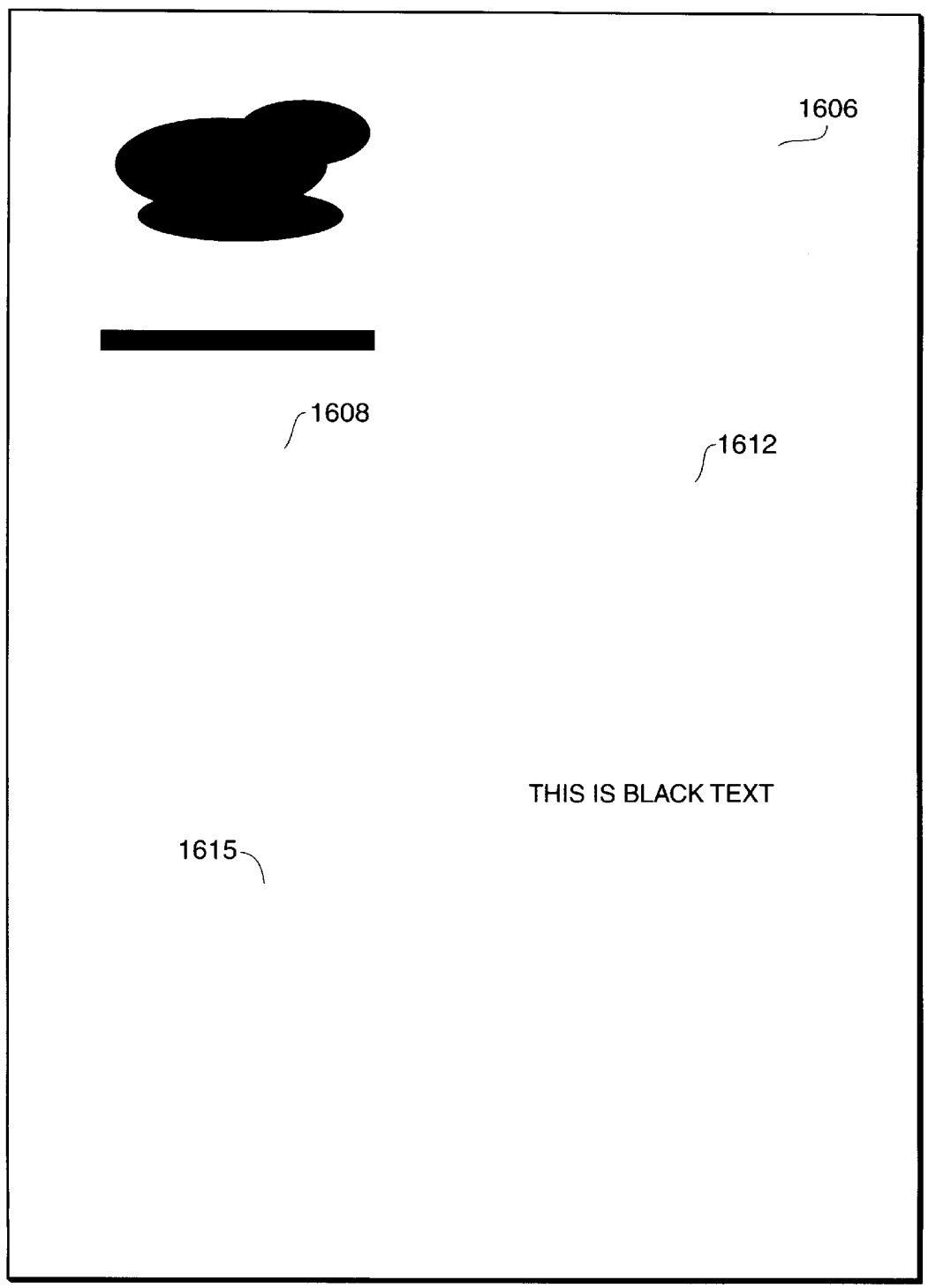
FIG. 16 is a view of binary image data residing in a buffer during color block selection according to the present invention.

Returning to FIG. 6, flow continues from step S607 to step S609, wherein image data currently within BW_Page and located within regions specified by the list of colored document regions are assigned a zero value. In this regard, FIG. 16 shows the contents of BW_Page after step S609. As shown, pixels within regions 1606, 1608, 1612, and 1615 have been assigned a zero value.

Figure 17:
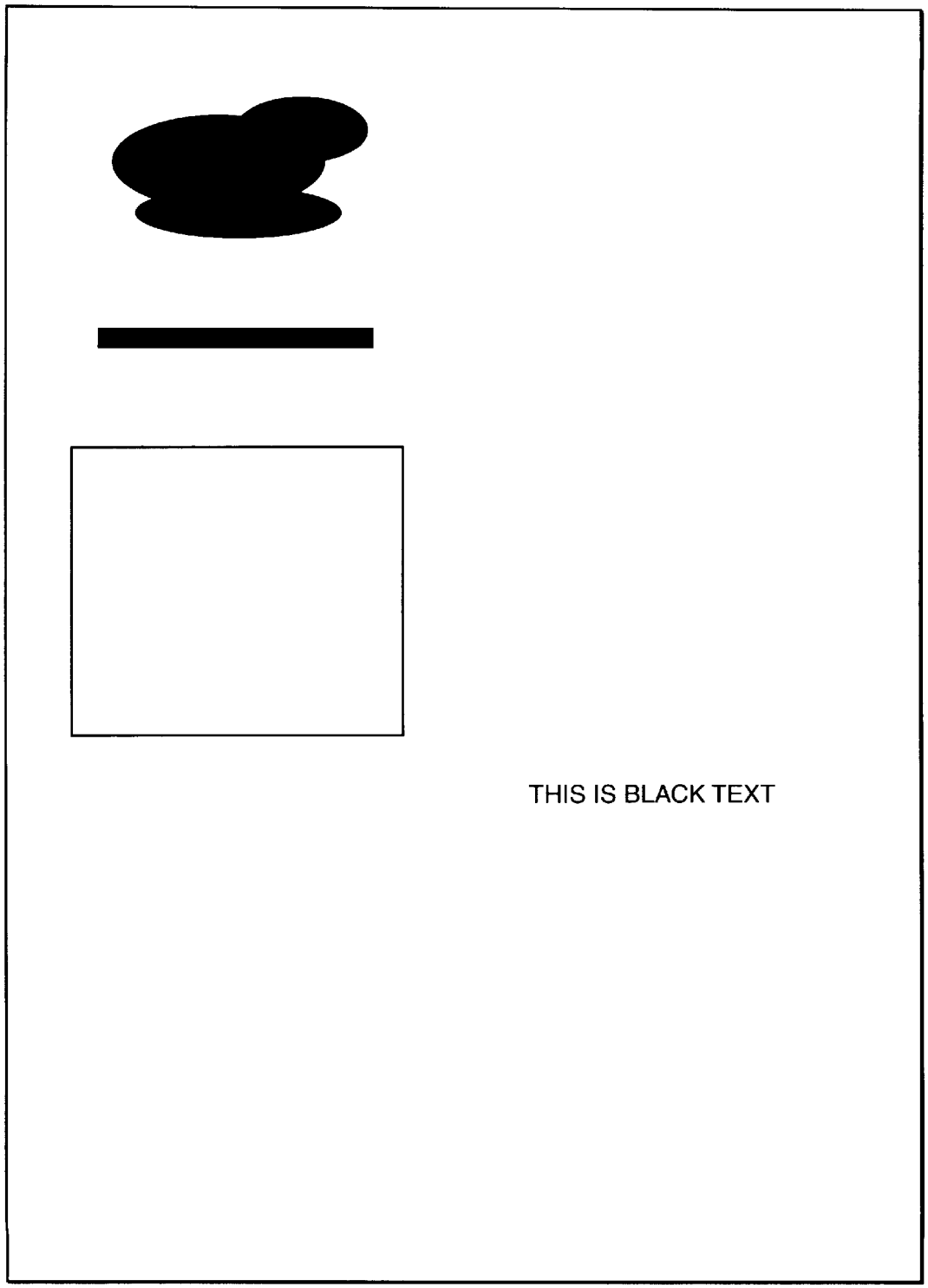
FIG. 17 is a view of binary image data residing in a buffer during color block selection according to the present invention.

Next, in step S610, one colored document region from the list of colored document regions is selected. In step S611, pixels surrounding the selected region of BW_Page are assigned a value of one. FIG. 17 shows the contents of BW_Page after execution of step S611 in a case that region 1608 was selected in step S610.

In step S612, a threshold binarization area of the selected region is defined based on a most prevalent RGB value in input image data corresponding to the region. Such processing proceeds as previously described with respect to FIG. 8. Next, in step S613, the image data of the selected region is binarized based on the threshold binarization area of the selected region. The binarized image data of the selected region is stored in a second buffer, hereinafter referred to as BW_Page_tmp.

Figure 18:
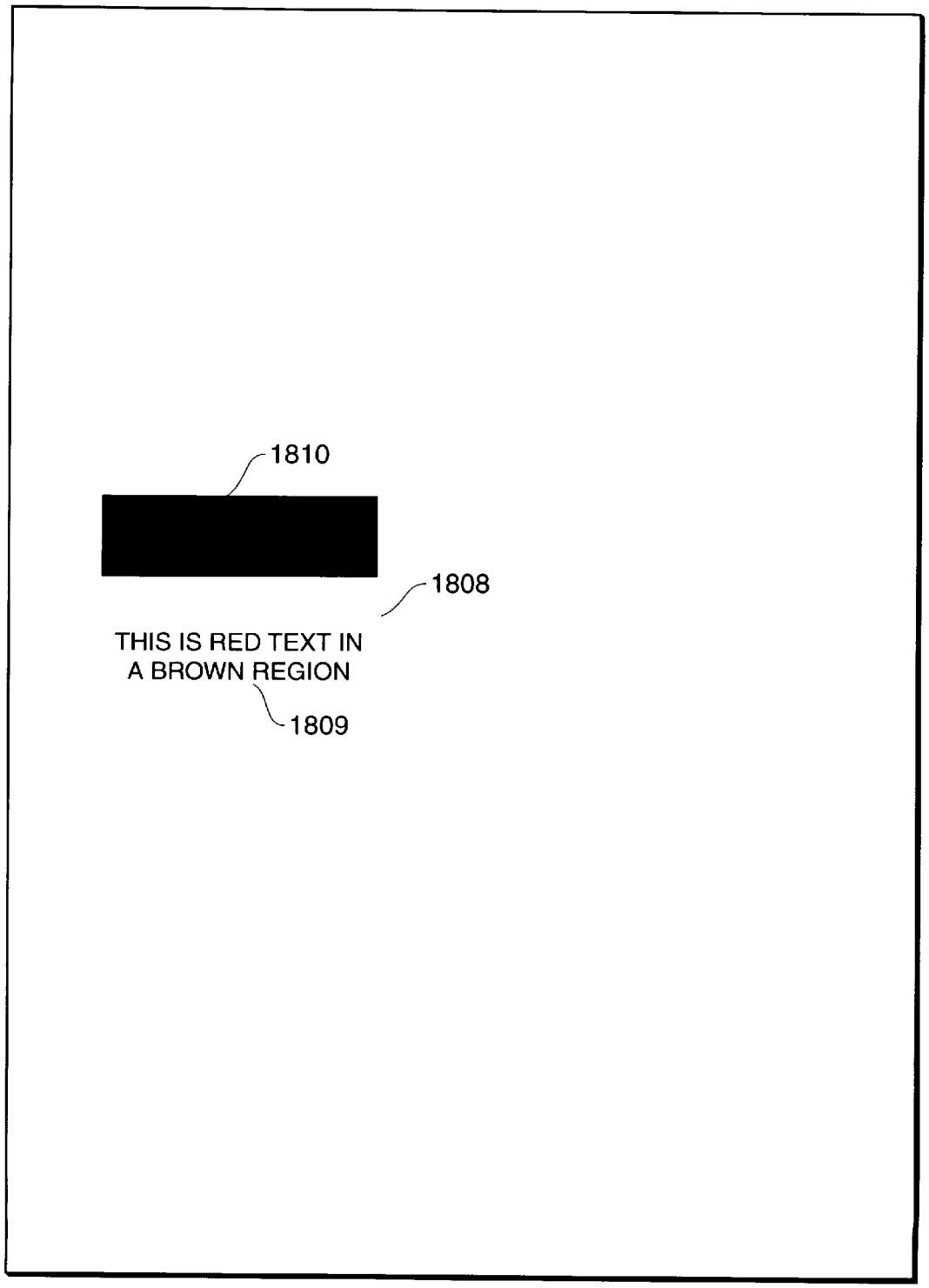
FIG. 18 is a view of binary image data residing in a buffer during color block selection according to the present invention.

FIG. 18 shows the contents of BW_Page_tmp after execution of step S613. In this regard, all input pixel values corresponding to region 1810 of BW_Page_tmp fall outside of the threshold binarization area defined in step S612. Accordingly, region 1810 is represented in BW_Page_tmp by black pixels. Similarly, text 1809 within region 1808 also falls outside of the threshold binarization range and is therefore represented by black pixels. Next, in step S615, the background value of the selected region is set to the average RGB value of image data zeroed in step S613.

Generally, steps S612, S613, and S615 correspond to steps S604, S605, and S606, described above, differing in that steps S604 to S606 concern an entire document image, while steps S612, S613, and S615 concern a specific region of the document image.

In step S616, it is determined whether additional unexamined colored document regions exist in BW_Page. Accordingly, steps S610 to S615 are executed with respect to each of the unexamined colored document regions.

Figure 19:
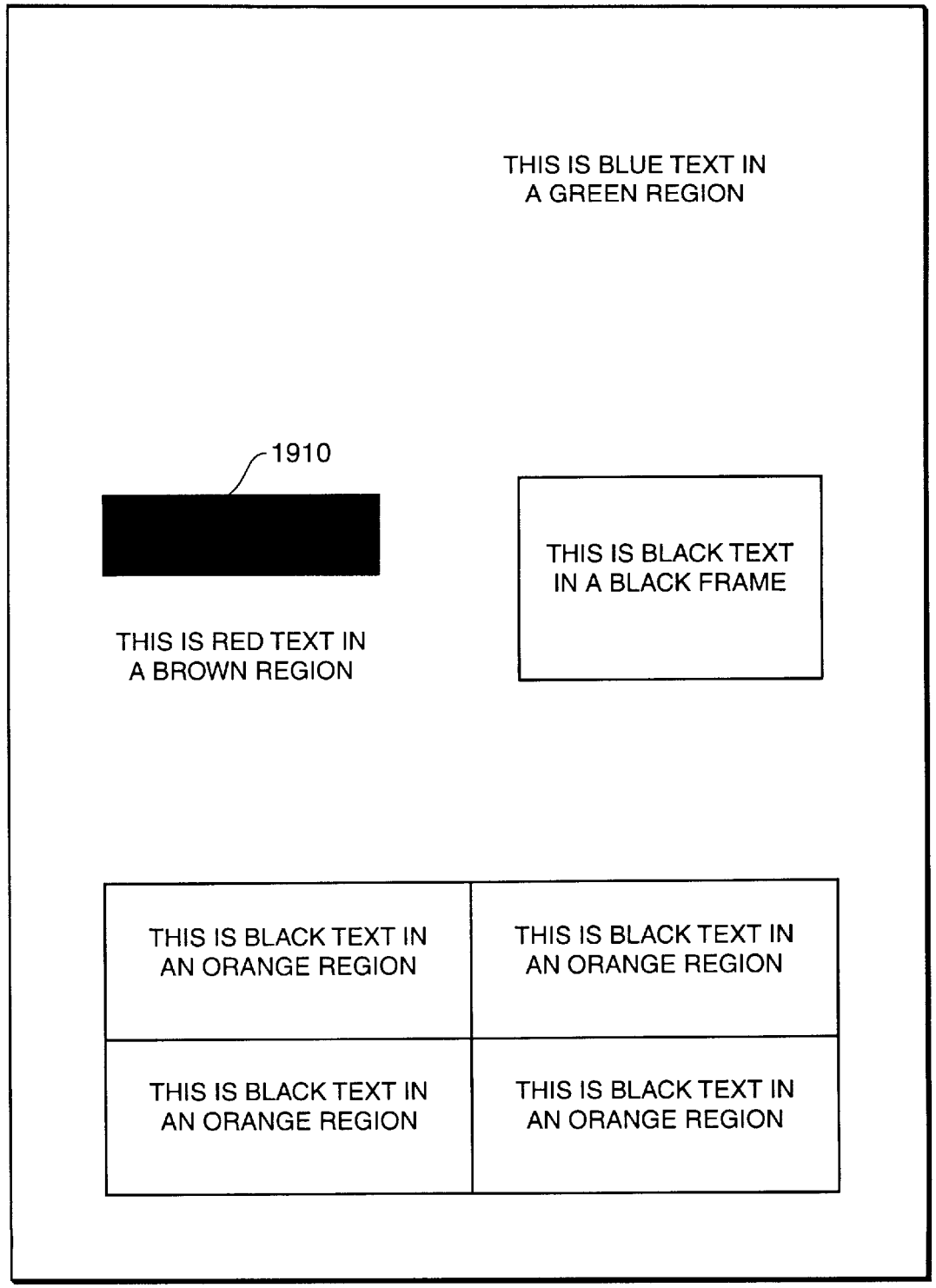
FIG. 19 is a view of binary image data residing in a buffer during color block selection according to the present invention.

FIG. 19 shows the Contents of BW_Page_tmp after execution of steps S610 through S615 with respect to each colored document region in the list of colored document regions. As explained above, regions 106, 108 and 110 of document 101 are not surrounded by black pixels. Accordingly, FIG. 19 shows that, after execution of steps S610 through S615 with respect to each colored document region, these regions are not surrounded by black pixels.

Next, colored document regions within BW_Page_tmp are identified in step S617. In step S618, redundant colored document regions are discarded. Step S618 is necessary to correct for errors in the above process.

Figure 20:
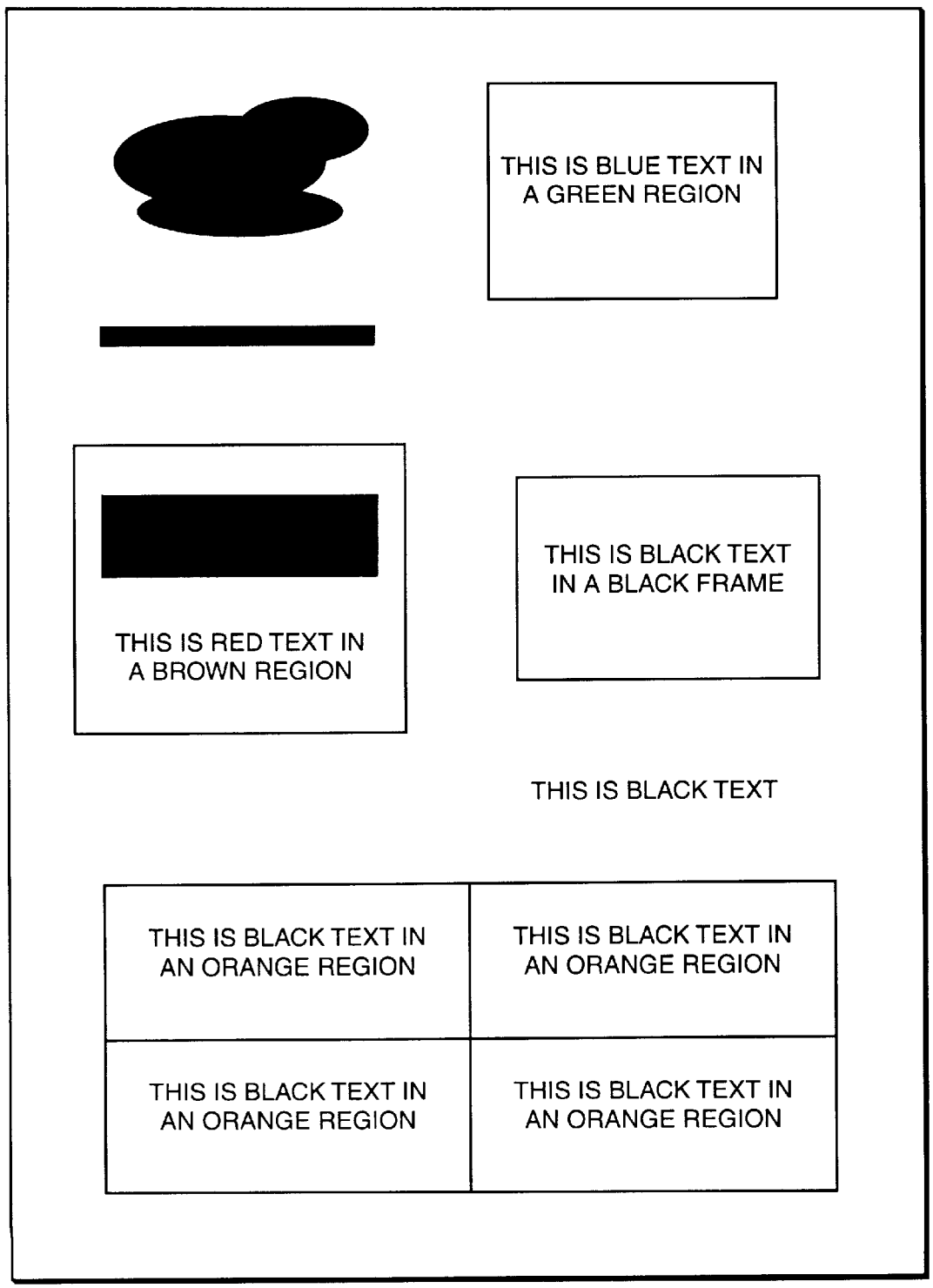
FIG. 20 is a view of binary image data residing in a buffer during color block selection according to the present invention.
Figure 21:
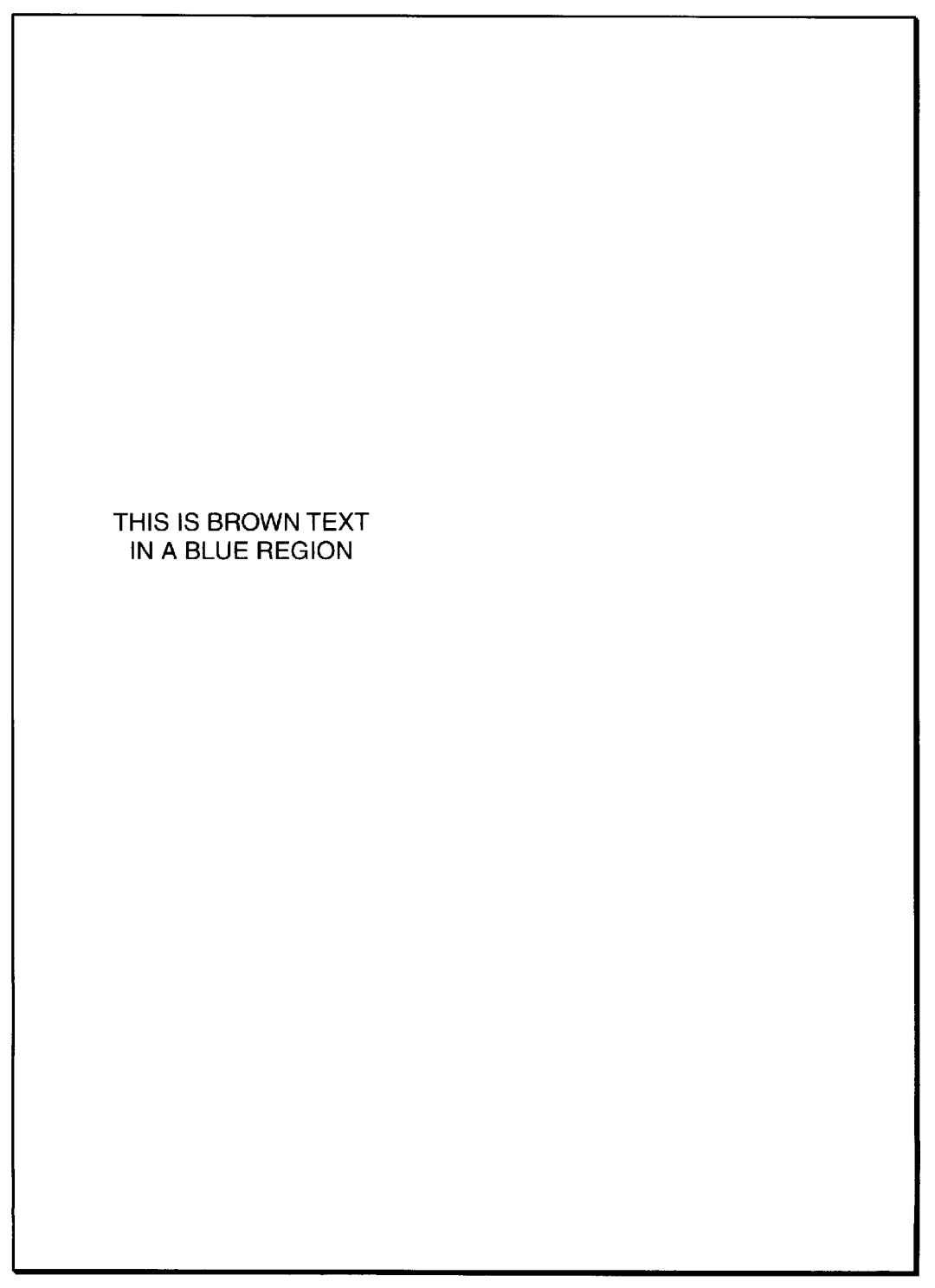
Figure 22:
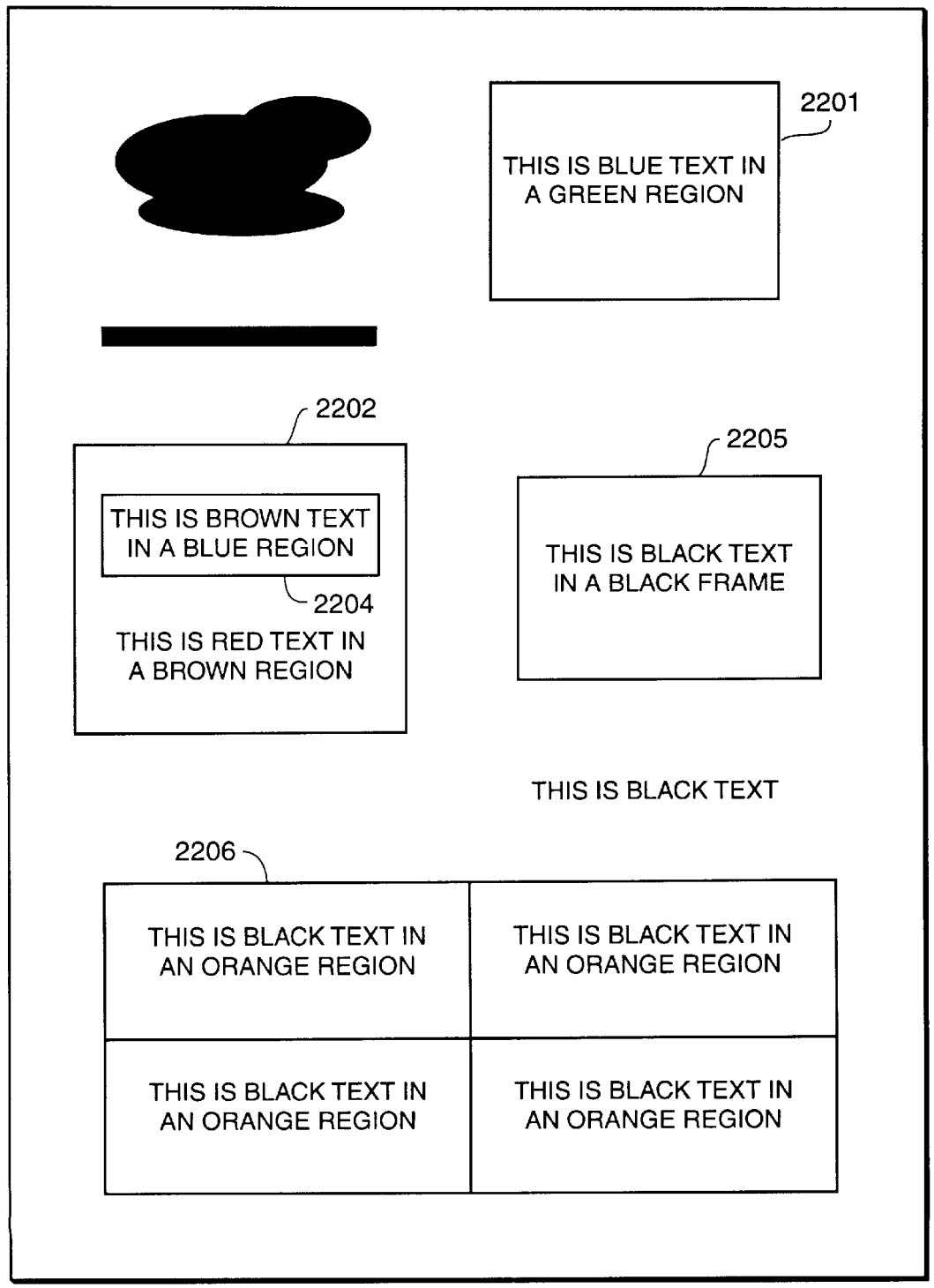
FIG. 22 is a view of binary image data residing in a buffer during color block selection according to the present invention.

In step S620, the current BW_Page and the current BW_Page_tmp are combined using a logical OR operation to produce an updated BW_Page, shown in FIG. 20. Next, in step S621, it is determined, using the techniques described above with respect to FIG. 14, whether any other colored document regions exist within BW_Page_tmp. If so, BW_Page_tmp is initialized in step S622 to remove all data therein and flow returns to step S609. For example, region 1910 in BW_Page_tmp is detected in step S621, which results in initialization of BW_Page_tmp in step S622. Thereafter, in step S609, the image data in region 1910 of BW_Page is assigned a zero value and flow proceeds as described above. Accordingly, after a subsequent return to step S621, the contents of BW_Page_tmp and BW_Page are as shown in FIG. 21 and FIG. 22, respectively.

Flow proceeds from step S621 to S624, wherein a black/white block selection process is performed on the contents of BW_Page as generally described above with respect to FIG. 3. Next, post-processing is performed in step S625.

Figure 23:
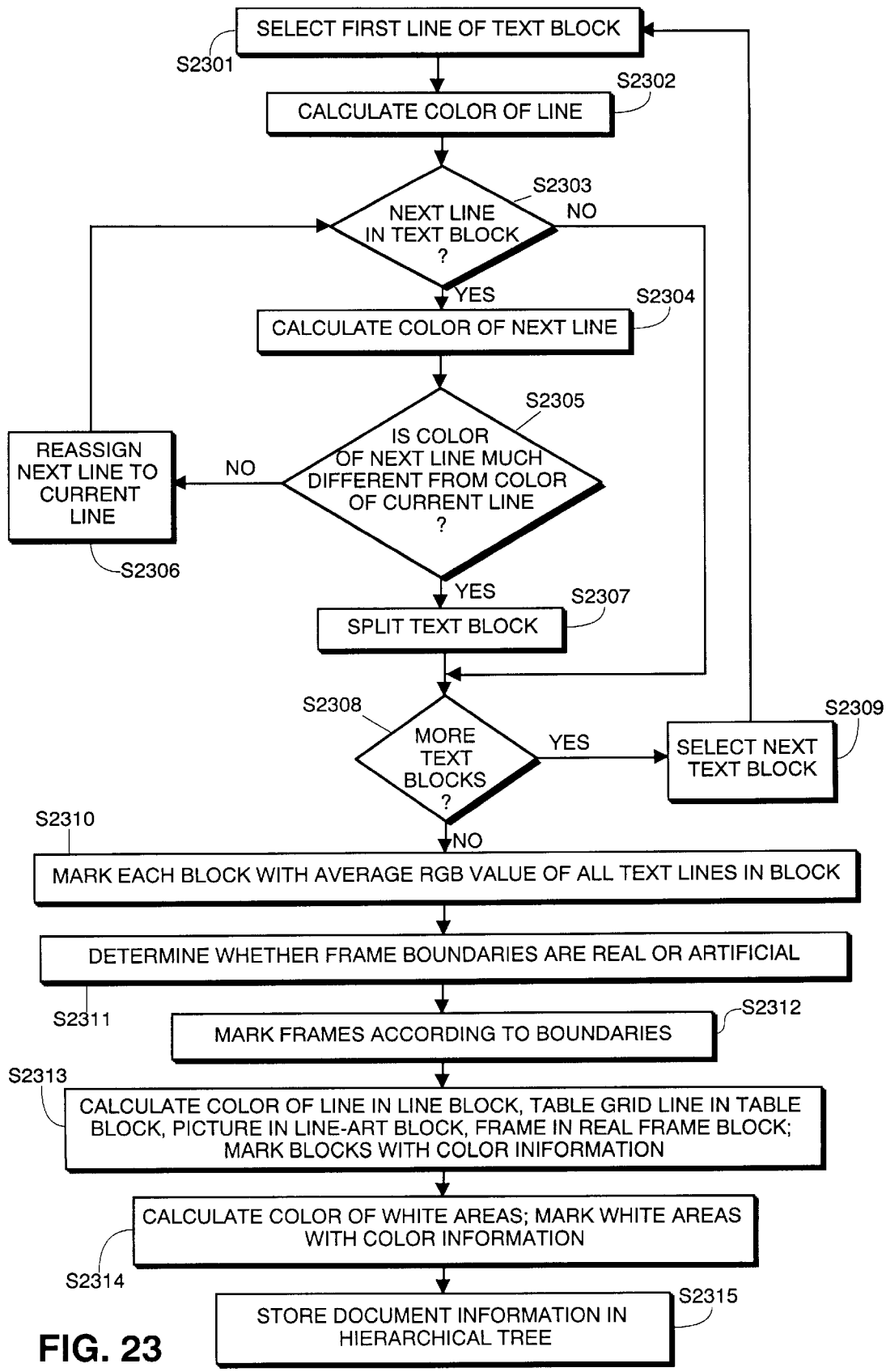
FIG. 23 is a flow diagram of process steps to perform post-processing according to the present invention.

FIG. 23 is a flow diagram of process steps to perform post-processing according to the present invention. Preferably, the FIG. 23 process steps are embodied as computer-executable process steps stored on a computer-readable medium, such as fixed disk 3. In this case, the computer-executable process steps are loaded into RAM 30 from disk 3 and executed therefrom by CPU 20.

Flow begins at step S2301, in which a first line of a text block is selected. In step S2302, a color of the selected text line is calculated by averaging input RGB values of each pixel of the text line which is assigned a value of one in BW_Page. Next, in step S2303, it is determined whether a next text line exists in the text block. If not, flow proceeds to step S2308 for selection of a new text block. If so, a color of a next line in the text block is calculated in step S2304 in the same manner as described with respect to step S2302.

If, in step S2305, it is determined that the colors calculated in steps S2302 and S2304 are not much different, flow continues to step S2306, wherein the next line is reassigned to the current line. Flow then returns to step S2303.

If the colors are determined to be much different in step S2305, the text block is split into two separate text blocks in step S2307, each block containing one of the text lines analyzed in step S2305. Next, in step S2308, it is determined whether more text blocks exist within the subject image data. If more text blocks exist, flow continues to step S2309, wherein a new text block is selected, and then returns to step S2301 as described above.

Accordingly, step S2301 to step S2307 are repeated for each text line-and text block in an analyzed document so that each resulting text block consists only of text lines corresponding to similarly-colored input pixel values. In this regard, each text block is marked, in step S2310, with an average RGB value of input image data corresponding to each text line in the block.

Flow continues from step S2310 to, step S2311, in which it is determined whether frame boundaries located within BW_Page are real (existing in the input document image) or artificial (created to represent a colored region). Such frame information is necessary in order to accurately reproduce the document image from data stored in the hierarchical tree structure to be described below. Accordingly, the frames are marked in step S2312 to indicate whether they are real or artificial. With respect to the present example illustrated in Figure indicate whether they are real or artificial. With respect to the present example illustrated in FIG. 22, frames 2201, 2202 and 2204 are artificial, and frames 2205 and 2206 are real.

In step S2313, colors of lines in line blocks, grid lines in table blocks, pictures in line-art blocks, and frames in real frame blocks are calculated based on average RGB values of input image data corresponding to pixels in the blocks which have been binarized to the value one. Next, the blocks are marked with the calculated color information.

Colors of white areas within BW_Page, such as areas inside frames, areas inside table cells, and areas inside line art, are calculated in step S2314. To calculate these colors, input RGB values of pixels zeroed in the relevant white areas of BW_Page are averaged. The white areas are then marked with color information.

Figure 24:
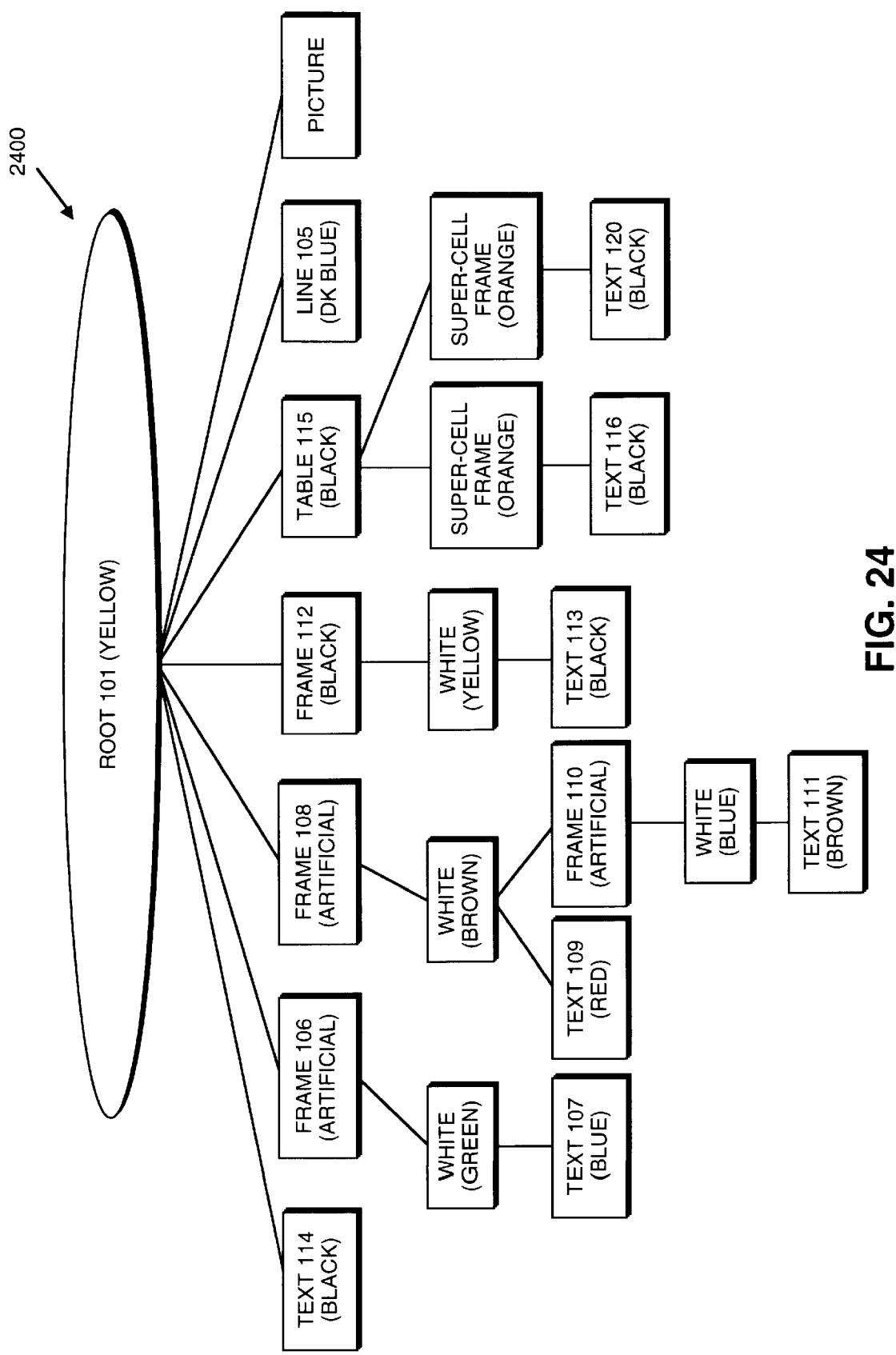
FIG. 24 is a view of a hierarchical tree structure according to the present invention.

The FIG. 23 flow terminates at step S2315, in which document information produced by the foregoing process steps is stored in a hierarchical tree structure. Such a hierarchical tree structure is illustrated in FIG. 24.

It should be noted that the information stored in tree structure 2400 occupies a small amount of memory and can be used to reconstruct a substantial representation of document. 101. Advantageously, tree structure 2400 may be edited so as to change an appearance of a document subsequently produced from the edited tree structure. In this regard, above-referenced U.S. application Ser. No. 08/834, 856 describes a system to add, remove, combine, and split nodes within a hierarchical tree structure, and also to edit information within the nodes.

It should be noted that location information of data represented by nodes in tree 2400 is in the form of rectangularized coordinates. Accordingly, using only location information and color attributes stored within tree 2400 to reproduce region 106, text 107 would be represented by a blue rectangle.

By analyzing the region of BW_Page corresponding to region 106, however, black pixels within region 106 can be maintained black or separately colored, while other pixels within region 106 could be reproduced using the stored color attribute for region 106. Similarly, white pixels within regions of BW_Page can be maintained white or separately colored while editing colors of surrounding regions of pixels. Even though these processes require storage of an entire bitmapped document (BW_Page) as well as the above-described hierarchical tree structure, it should be noted that the bitmapped document is twenty-four times smaller than the originally input full-color (24-bit) pixel data. Accordingly, the increased memory requirements can be far outweighed by the benefits of color storage and editing.

While the present invention-is described above with respect to what is currently considered its preferred embodiments, it is to be understood that the invention is not limited to that described above. To the contrary, the invention is intended to cover various modifications and equivalent arrangements included within the spirit and scope of the appended claims.

What is claimed is:

1. A method for identifying features of a color image, comprising the steps of:

inputting primary color values representing a color image;

calculating a threshold binarizing range based on the input values;

binarizing the input values into binary values based on the threshold binarizing range;

identifying a colored region within the image, the colored region having at least one color outside the threshold binarizing range;

defining a frame surrounding the identified colored region;

calculating a second threshold binarizing range based on input primary values corresponding to the colored region; and binarizing the input primary values corresponding to the colored region based on the second threshold binarizing range.

2. A method according to claim 1, further comprising the steps of:

calculating a background color of the image based on input primary values corresponding to the threshold binarizing area; and calculating a background color of the colored region based on the primary values corresponding to the colored region.

3. A method according to claim 2, further comprising the step of storing the background color of the image, the background color of the colored region, and the location of the frame.

4. A method according to claim 3, further comprising the step of storing a flag to indicate that the frame is not an element of the color image.

5. A method according to claim 3, further comprising the step of transmitting the stored information to a system for identifying features of the color image.

6. A method to binarize color pixel values, comprising the steps of:

inputting pixel values corresponding to a color image;

determining a core range of pixel values based on the input pixel values;

calculating a number of pixels having values within the core range of pixel values;

calculating a number of the pixels having values within an outer layer of the core range of pixel values; and defining a threshold binarizing area, wherein, in a case that the number of pixels within a subject outer layer of the core range of pixel values is a local minimum value, the threshold binarizing area is defined as the subject outer layer and an area circumscribed by the subject outer layer.

7. A method according to claim 6, further comprising the step of calculating a background color of the color image based on an average value of input pixel values within the threshold binarizing area.

8. A method according to claim 6, further comprising the steps of:

defining a secondary threshold binarizing area; and extending the threshold binarizing area in a case that a distance between the threshold binarizing area and the secondary threshold binarizing area is greater than a predetermined value.

9. A method according to claim 6, further comprising the step of calculating a foreground color of the color image based on an average value of input pixel values within the secondary threshold binarizing area.

10. A computer-readable medium storing computer-executable process steps to identify features of a color image, the process steps comprising:

a receiving step to receive primary color values representing a color image;

a calculating step to calculate a threshold binarizing range based on the received values;

a binarizing step to binarize the received values into binary values based on the threshold binarizing range;

an identifying step to identify a colored region within the image, the colored region having at least one color outside the threshold binarizing range;

a defining step to define a frame surrounding the identified colored region;

a calculating step to calculate a second threshold binarizing range based on received primary values corresponding to the colored region; and a binarizing step to binarize the received primary values corresponding to the colored region based on the second threshold binarizing range.

11. A computer-readable medium according to claim 10, the process steps further comprising:

a calculating step to calculate a background color of the image based on received primary values corresponding to the threshold binarizing area; and a calculating step to calculate a background color of the colored region based on received primary values corresponding to the colored region.

12. A computer-readable medium according to claim 11, the process steps further comprising a storing step to store the background color of the image, the background color of the colored region, and the location of the frame.

13. A computer-readable medium according to claim 12, the process steps further comprising a storing step to store a flag to indicate that the frame is not an element of the color image.

14. A computer-readable medium according to claim 12, the process steps further comprising a transmitting step to transmit the stored information to a system for identifying features of the color image.

15. A computer-readable medium storing computer-executable process steps to binarize color pixel values, the process steps comprising:

a receiving step to receive pixel values corresponding to a color image;

a determining step to determine a core range of pixel values based on the received pixel values;

a calculating step to calculate a number of the received pixels having values within the core range of pixel values;

a calculating step to calculate a number of the received pixels having values within an outer layer of the core range of pixel values; and a defining step to define a threshold binarizing area, wherein, in a case that the number of received pixels having values within a subject outer layer of the core range of pixel values is a local minimum value, the threshold binarizing area is defined as the subject outer layer and an area circumscribed by the subject outer layer.

16. A computer-readable medium according to claim 15, the process steps further comprising a calculating step to calculate a background color of the color image based on an average value of received pixel values within the threshold binarizing area.

17. A computer-readable medium according to claim 15, the process steps further comprising:

a defining step to define a secondary threshold binarizing area; and an extending step to extend the threshold binarizing area in a case that a distance between the threshold binarizing area and the secondary threshold binarizing area is greater than a predetermined value.

18. A computer-readable medium according to claim 15, the process steps further comprising a calculating step to calculate a foreground color of the color image based on an average value of received pixel values within the secondary threshold binarizing area.

* * * * *

UNITED STATES PATENT AND TRADEMARK OFFICE
CERTIFICATE OF CORRECTION

PATENT NO. : 6,360,006 B1
DATED : March 19, 2002
INVENTOR(S) : Wang

It is certified that error appears in the above-identified patent and that said Letters Patent is hereby corrected as shown below:

Title page,
Item [56], References Cited, U.S. PATENT DOCUMENTS, insert:
-- 5,128,748   7/1992 Murakami et al. .......... 358/75
5,155,594   10/1992 Bernstein et al. ............358/136
5,159,443   10/1992 Ando .......................358/75
5,444,489   8/1995 Truong et al. ..............348/422
5,576,849   11/1996 Murakami et al. ..........358/450
5,761,342   6/1998 Yoshida ....................382/270
5,796,876   8/1998 Wang et al. .................382/2
5,841,899   11/1998 Ide et al. ....................382/168 --.

Column 6,
Line 39, "analyses" should read -- analysis --; and
Line 44, "8310," should read -- S310, --; and "inputdocument" should read
-- input document --.

Column 11,
Line 18, "1104, region 130H," should read -- 1304, region 1306 --.

Column 13,
Line 20, "line-and" should read -- line and --;
Line 35, "With respect to the present example illustrated in" should be deleted; and
Line 36, "Figure indicate whether they are real or artificial." should be deleted.

Signed and Sealed this

Twenty-second Day of July, 2003

JAMES E. ROGAN
*Director of the United States Patent and Trademark Office*